US010961091B2

(12) United States Patent
Benz

(10) Patent No.: US 10,961,091 B2
(45) Date of Patent: Mar. 30, 2021

(54) TRACKED LIFTING PLATFORM FOR VEHICLES, AND LIFTING MECHANISM FOR A TRACKED LIFTING PLATFORM

(71) Applicant: Gerhard Finkbeiner, Freudenstadt (DE)

(72) Inventor: Dieter Benz, Alpirsbach (DE)

(73) Assignee: Gerhard Finkbeiner, Freudenstadt (DE)

( * ) Notice: Subject to any disclaimer, the term of this patent is extended or adjusted under 35 U.S.C. 154(b) by 252 days.

(21) Appl. No.: 16/099,784

(22) PCT Filed: May 11, 2017

(86) PCT No.: PCT/EP2017/061307
§ 371 (c)(1),
(2) Date: Nov. 8, 2018

(87) PCT Pub. No.: WO2017/194666
PCT Pub. Date: Nov. 16, 2017

(65) Prior Publication Data
US 2019/0169003 A1    Jun. 6, 2019

(30) Foreign Application Priority Data

May 12, 2016   (DE) ..................... 20 2016 102 566.4

(51) Int. Cl.
*B66F 3/06*       (2006.01)
*B66F 7/00*       (2006.01)
(Continued)

(52) U.S. Cl.
CPC .................. *B66F 3/06* (2013.01); *B66F 7/00* (2013.01); *B66F 13/005* (2013.01); *F16G 13/20* (2013.01); *F16H 19/0636* (2013.01)

(58) Field of Classification Search
CPC .. B66F 13/005; B66F 7/00; B66F 7/02; B66F 7/04; B66F 7/10; B66F 3/06
See application file for complete search history.

(56) References Cited

U.S. PATENT DOCUMENTS 2,574,657 A * 11/1951 Pierce ..................... B66F 3/06
                                                        254/1
5,368,113 A    11/1994 Schulze-Beckinghausen
(Continued)

FOREIGN PATENT DOCUMENTS

DE      101 03 490 A1    8/2002
EP      0 593 803 A1    4/1994
(Continued)

OTHER PUBLICATIONS

International Search Report for corresponding Patent Application No. PCT/EP2017/061307 dated Aug. 21, 2017.

*Primary Examiner* — Tyrone V Hall, Jr.
(74) *Attorney, Agent, or Firm* — Renner, Otto, Boisselle & Sklar, LLP

(57) ABSTRACT

Disclosed is a tracked lifting platform for vehicles (14), comprising at least two tracks (16), wherein each track (16) engages at least at a respective end region of a lifting platform (18) for lifting and lowering the track (16) between a basic position (19) and a working position (21), wherein the lifting platform (18) comprises a push column (21) with multiple push members (23), which can be arranged one above the other so as to be resistant to pressure in the vertical direction.

27 Claims, 19 Drawing Sheets

Figure 1:
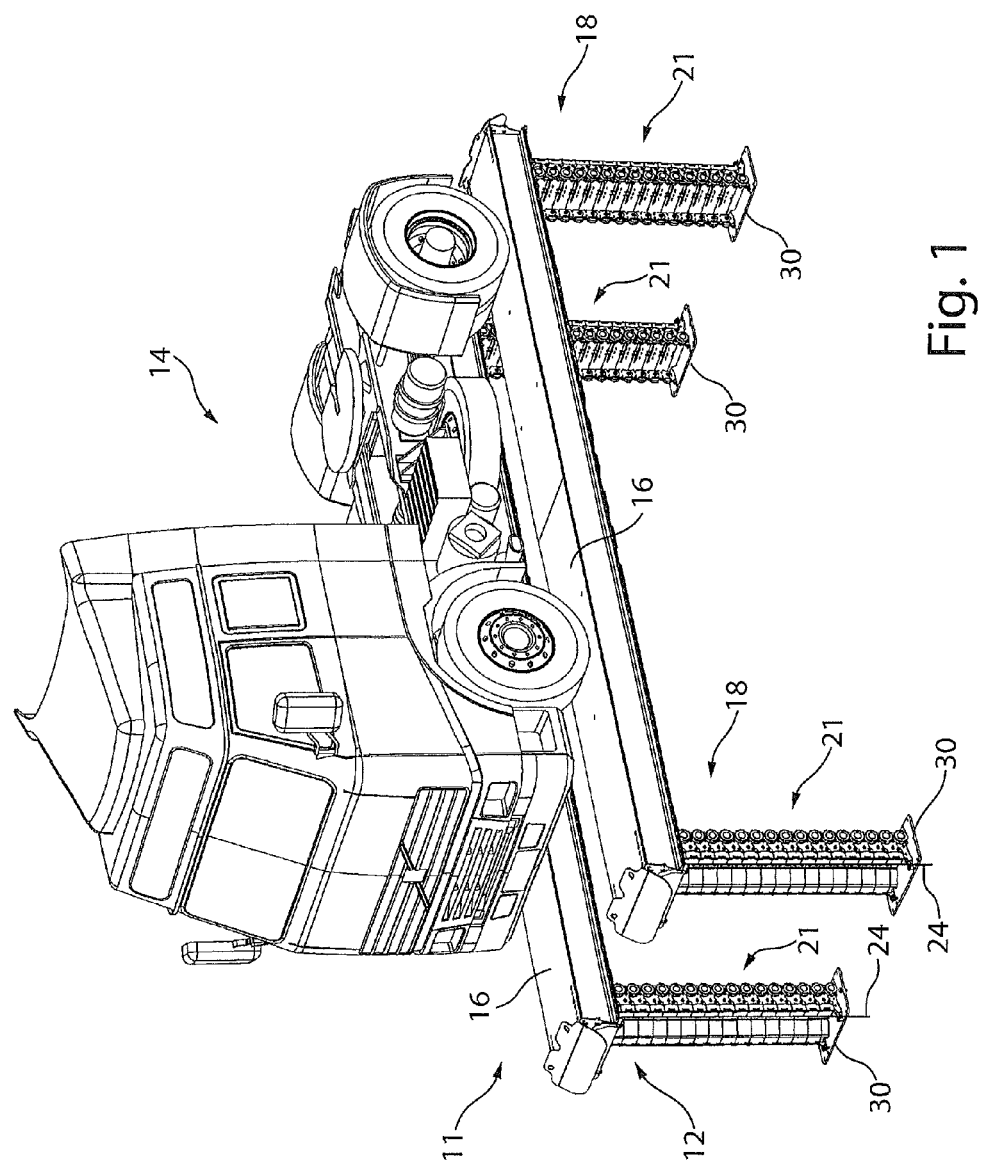

(51) Int. Cl.
*B66F 13/00* (2006.01)
*F16G 13/20* (2006.01)
*F16H 19/06* (2006.01)

(56) References Cited

U.S. PATENT DOCUMENTS

| | | | |
|---|---|---|---|
| 6,224,037 B1 | 5/2001 | Novick | |
| 2009/0236183 A1* | 9/2009 | Bordwell | B66F 3/46 187/234 |
| 2014/0338303 A1* | 11/2014 | Shoji | F16G 13/20 59/93 |
| 2015/0166315 A1* | 6/2015 | Knapp | B66F 1/06 700/213 |

FOREIGN PATENT DOCUMENTS

| | | | |
|---|---|---|---|
| EP | 0 983 897 B1 | 3/2000 | |
| EP | 1 006 074 A1 | 6/2000 | |
| EP | 2 531 437 A1 | 12/2012 | |
| JP | 2006 137526 A | 6/2006 | |
| JP | 2014 185682 A | 10/2014 | |
| JP | 2015 055309 A | 3/2015 | |
| KR | 101 047 966 B1 | 7/2011 | |
| WO | WO-8803078 A1 * | 5/1988 | B65B 7/2842 |
| WO | WO 2003/071158 A1 | 8/2003 | |
| WO | WO 2011/092078 A1 | 4/2011 | |

* cited by examiner

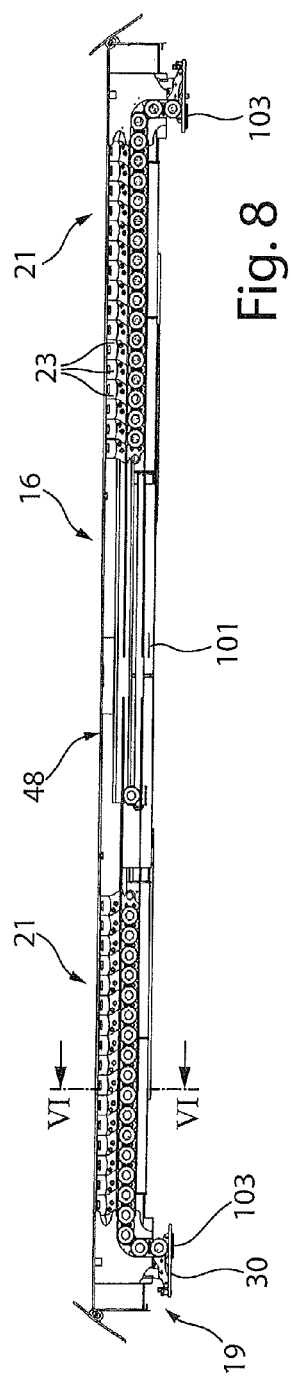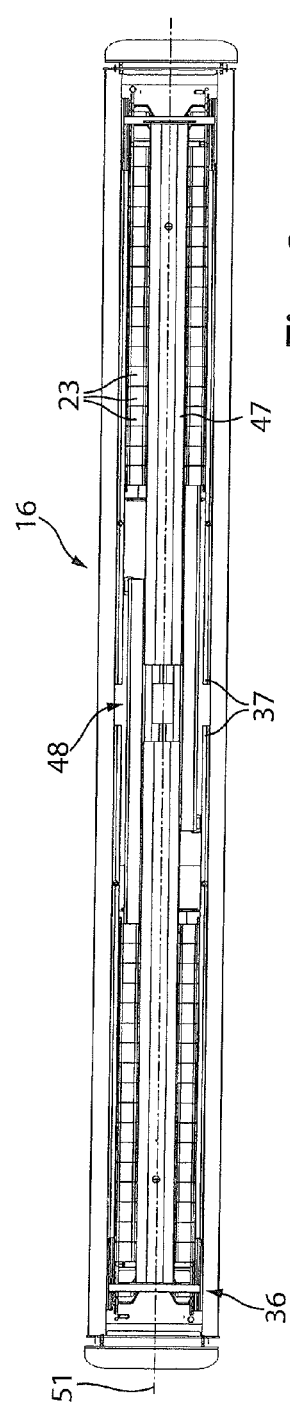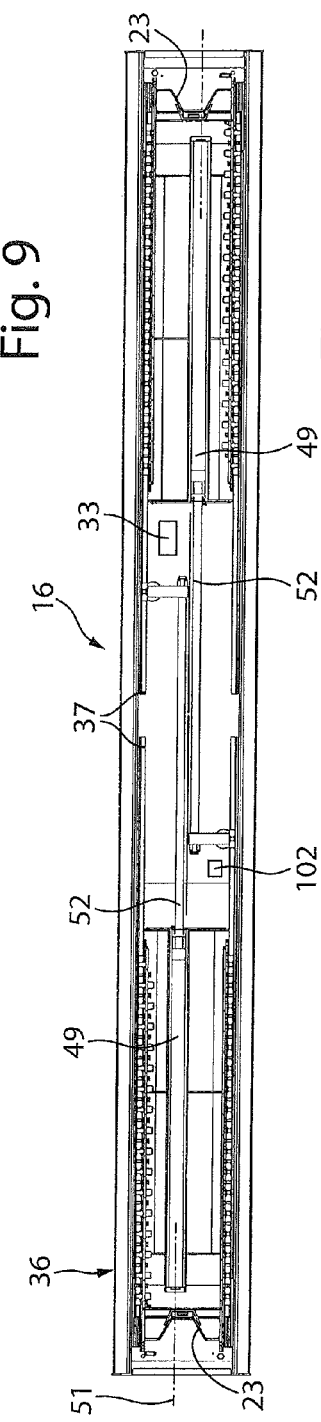

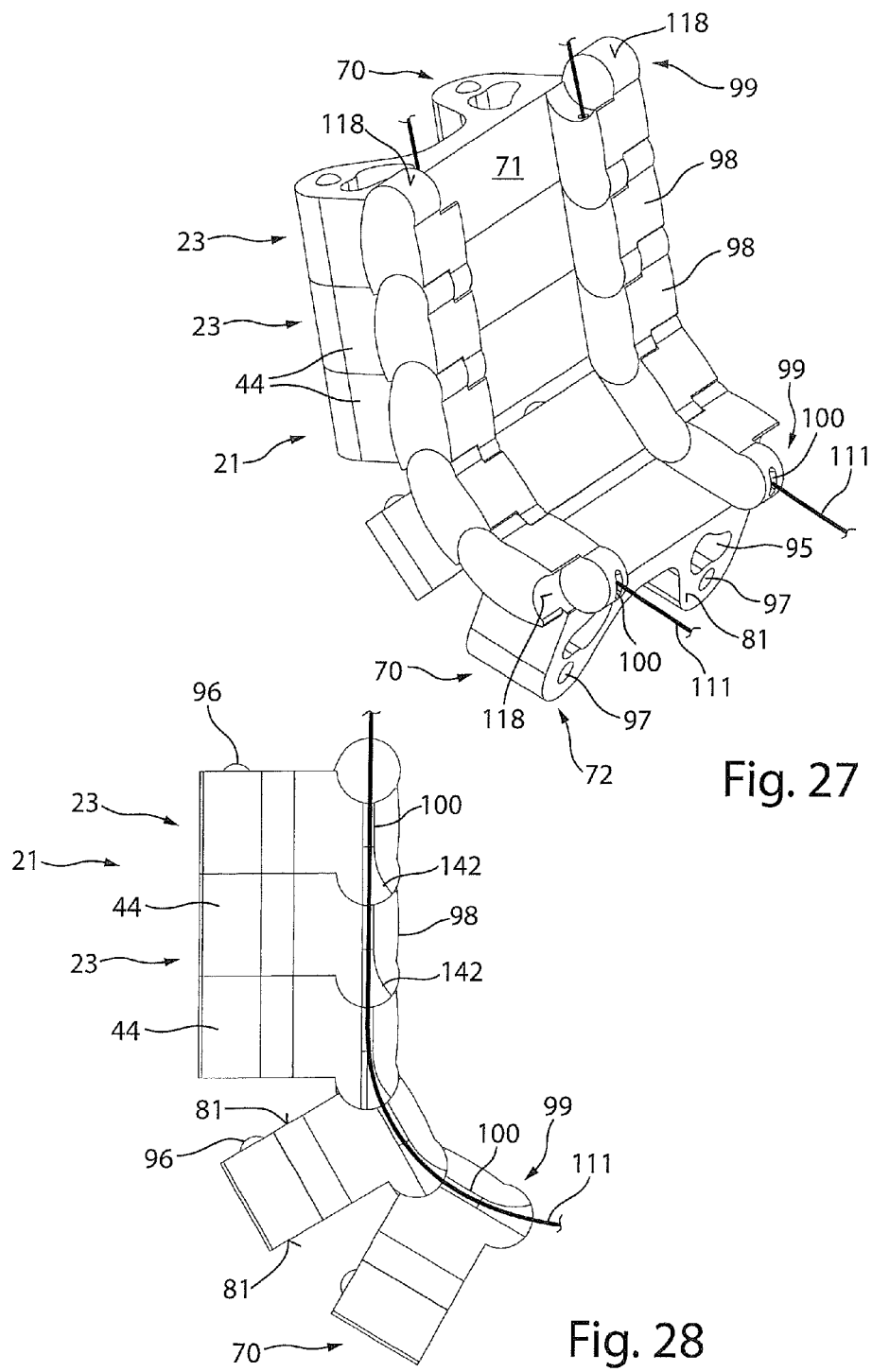

TRACKED LIFTING PLATFORM FOR VEHICLES, AND LIFTING MECHANISM FOR A TRACKED LIFTING PLATFORM

The invention relates to a tracked lifting platform for vehicles, comprising two tracks, wherein each track comprises a lifting mechanism at least on a respective end region which lifting mechanism acts for the lifting and lowering of the track between a basic position and a working position. The invention further relates to a lifting mechanism, in particular for tracks.

EP 0 983 897 B1 discloses a tracked lifting platform, which includes two tracks, which can be displaced from an extension position in a working position by means of a lifting mechanism. The lifting mechanism comprises a lifting cylinder as well as a semi-scissors, by means of which the track can be moved up and down.

Alternatively, these types of tracked lifting platforms can also be equipped with full-scissors instead of the parallelogram mechanics. The requirements on such track lifting platforms are increasing. In particular, a greater adaption to customer requirements regarding the lifting height is required. Moreover, it is desirable that the visible mechanics between the ground and the track is reduced as much as possible, so that a lateral accessibility into the working space is also improved when positioning the tracked lifting platform in a working position.

The object underlying the invention is to provide a tracked lifting platform which allows a reduced visible mechanics below the track and which is flexibly adjustable in the lifting height. Furthermore, the object underlying the invention is to provide a lifting mechanism for such a tracked lifting platform.

This object is achieved by means of a tracked lifting platform, in which the track includes a lifting mechanism at least at a respective end region of the track, which comprises push columns with multiple push members, which are arrangeable one above the over in a manner pressure-resistant in the vertical direction. Such pressure-resistant push columns provide the advantage that they merely form one vertical column when positioning the track in a working position, which column support the track. The visible mechanics is reduced thereby, and accessibility below the track is increased. In addition, such pressure-resistant push columns, due to the construction with multiple push members, provide the advantage that a flexible adaption to the lifting height is made possible by the selection of the number of the push members for forming the push element.

A preferred embodiment of the tracked lifting platform provides that the push column consists of multiple push members, wherein adjacent push members stand in connection with one another about a deflection axis, formed at least between two push members, which is disposed eccentrically to the push members and transversely to the longitudinal direction of the push column. The push members are pivotable in a direction about the deflection axis and, in the opposite direction, are configured to be rigid in compression by the superposed push bodies of the push members. Two adjacent push members are arranged at no tilt to one another in the longitudinal direction of the deflection axis. Such pressure-resistant push columns make it possible that they are configured to be rigid along the longitudinal direction of the push column and can transmit a pressure force or push force, and nevertheless have a possibility of inclining the push members in a direction in order to take different lengths in respect to the lifting height. As a result, an almost continuous adjustment of a working height of the track in relation to a basic position, where the tracks rest on the ground, is made possible through a lining-up of multiple push members in the vertical direction.

At least one push column is provided on each end region of the track, wherein the two push columns arranged on each end region are oriented in opposite directions to one another. As a result, it is made possible that the two opposite push columns mutually support one another, i.e. stop in the pressure-stable position, allowing a secured orientation of the track in the working position.

Preferably, the push members of the opposite push columns, which are arranged in the respective end region of the track, are each oriented pivotably toward the center of the track. This means that a pressure-rigid or pressure-stable arrangement of the push columns exists when a force is applied in a longitudinal direction of the track in a working position, since in each case one of the two push columns counteracts a potential force application in the longitudinal direction of the track.

It is preferably provided that the track of the tracked lifting platform comprises at least one lifting mechanism, which includes a support structure, which consists at least of a guidance and a deflection device, by means of which the push column is accommodated. This configuration of the lifting mechanisms with the support structure constitutes a module for the formation of the track, which enables the linking to the track in two different ways. For one, the support structure can be arranged, with the guide track and the deflection device, in a base body of the track, so that the extendable portion of the push column engages on the ground with its free end. By contrast, the support structure can be provided on the ground or be embedded in the ground, so that the free end of the vertical portion engages on a lower side of the track.

The deflection device provided in the support structure preferably has a deflection of 90°, so that the push column, which is preferably oriented and guided horizontally by the guidance, can be deflected by 90° in a vertical direction. As a result, simple geometric relations are created, which additionally allow a compact installation or design of the lifting mechanism.

Preferably, the push column is inserted into the base body at a lower side of the base body of the track, or guided along on a lower side on the base body, and displaceably guided in or on the base body by means of a deflection device and a guidance adjoining it. A compact and likewise protected arrangement can be provided especially when inserting the push column into the base body.

Another preferred embodiment of the tracked lifting platform provides that the lifting mechanism comprises a drive, which is fixedly arranged on or on the base body of the track. An opposite end of the push column can engage on the base plate. Thereby, it can for example be effected that an easy lifting of the track from the extension position into the working position is made possible by an extension movement of the base plate, on the opposite end of the lifting column, controlled in relation to the base body of the track.

Furthermore, it is preferably provided that the drive is fixedly arranged on the support structure of the lifting mechanism.

The drive of the lifting mechanism preferably is configured as a hydraulic or pneumatic lifting cylinder, or as a Bowden cable. Moreover, an electromagnetically-, electrically-, pneumatically- or hydraulically-driven motor with a transmission, a servo mechanism, or the like can be provided as a drive, in order to drive the push columns. Depending on the situation of construction and the situation of supplies of a workshop, one of the drive elements can be selected and employed.

In a preferred use of a hydraulic or pneumatic lifting cylinder, the said cylinder can be arranged in the track, or on the support structure, in such a way that a pulling force is applied to the piston rod in a lifting movement of the track from the basic position into a working position. This comes with the advantage that the piston rod can be reduced in diameter. When using the lifting cylinder as a drive in the track, or on the support structure, it is preferably provided that a push element is provided on a free end of the piston rod, which is connected to one end of the push column. As a result, short tracks can likewise be equipped with a push column, since the pressure element extends in the opposite direction of the piston rod.

In another advantageous embodiment of the drive, it is provided that two lifting cylinders oriented in opposite directions are provided in the base body of the track, the cylinders being arranged oppositely and laterally offset to the longitudinal axis of the base body. This, in turn, allows achieving a space-saving arrangement in order to, at the same time, extend a push column on a respective end region of the base body of the track.

Furthermore, it is preferably provided that the piston rod of the lifting cylinder is guided laterally in the base body or in the support structure. As a result, a secured lifting movement of the track will be actuated. Just as well, the piston rod of the lifting cylinder may engage on the push column in an eccentric manner and be additionally guided.

The maximum lifting height of the working position can be determined by the number and/or the height of the push members of the push columns. Advantageously, the length of the push elements, which are connected to the piston rod of the lifting cylinder, can also be adjusted, so that a simple changeover or adaption to various lifting heights is possible.

For the securing of an extension position of the tracks, it is preferably provided that the push members comprise at least one latch element on a portion of the push body opposite the articulated axle, in which latch element a latch of a locking device engages and locks a lowering movement of the track. Securing of the working position can be effected after each further extension of the push member for the formation of a push column by arranging a latch element on each push member.

The latch of the locking device is advantageously provided above the push members displaceably-arranged in the base body, and the at least one latch element of the push member is oriented vertically upward when guided in the base body of the track, so that the latch engages into the latch element through gravity. As a result, a locking device that meets safety requirements can be readily provided.

Furthermore, it is preferably provided that the locking device is arranged in the base body, and preferably is accessible via a recess arranged in the tread, which preferably is closeable with a cover. As a result, easy access can be provided for maintenance purposes.

Another advantageous embodiment of the locking device provides that it comprises a magnetic drive, which, when activated, guides the latch out of the latch element. Once a lowering movement of the track is actuated, the magnetic drive is likewise actuated in order to release the secured position.

An alternative configuration of the locking device ensures that the locking device is assigned to the deflection mechanism and is formed as a latch, which engages on the respectively first push member oriented in the vertical direction by means of the deflection device, and is preferably lockable relative to the push members with a clamping or pressure force or weight force. For the retraction of the push column, the latch can be unlockable by means of an unlocking mechanism, in particular a lever, a cam or a magnetic force. This provides a simple constructional design and makes it possible that a securing of the newly taken position is made possible after the extension of each push member.

Furthermore, preferably a synchronization control with a least one sensor device is provided, in particular in or on the base body of the track, or on the support structure. The said control can be configured as a Bowden cable sensor. As a result, it can be monitored that the at least two pressure-resistant push columns, provided on a track, are extended in a uniform manner, so that the number of the push members forming a push column between the base plate and the track is equal. Furthermore, the uniform lifting and lowering of at least two tracks can be monitored and controlled by such a synchronization control. This ensures that a vehicle, which is located on it, is lifted and lowered uniformly without tilt.

Furthermore, each track can comprise a controller, preferably on or in the base body, or on the support structure, which communicate wirelessly and can be actuated with an operating device, preferably wirelessly. This makes it possible that at least the synchronization control is monitored and ensured between the two parallelly-oriented tracks. In addition, a simple operation via an operating device can advantageously be made possible in a wireless manner. As a result, a free accessibility into the working space of the track is made possible, without that cables are disturbing on the ground.

The tracked lifting platform is preferably configured with a monitoring device. The monitoring device can, for example, comprise at least one inclination sensor in each track, which is capable of detecting both the orientation of the running surface in the longitudinal direction, and in the transverse direction. Furthermore, at least one force sensor can be provided, which is, for example, provided on the base plate, or on at least one end of the push column in order to monitor the distribution of loads of the track in the lifted state. Furthermore, a displacement sensor can be provided in the track, in order to detect a retraction and extension movement of the push column, and thus a lifting path of the track. In addition, a sensor can be provided to detect a locking position of the locking device, in order to monitor the track in a safe operating state.

Just as well, at least one signal device for outputting optical and/or acoustic signals can be provided. These sensors and/or the synchronization control can be commonly monitored and/or queried and/or evaluated by the controller. Likewise, the push column can comprise at least one lighting for the working space. The at least one signal device and/or lighting can be provided on at least one push member and/or in at least one push member.

It is preferably provided that a controller of the tracked lifting platform detects and/or processes the signals of the synchronization control and/or the signals of the monitoring device in order to monitor the state of and operate the tracked lifting platform. In an operating device, preferably with a display, which is separately positioned relative to the tracks, or as a hand-held device, such as a tablet and the like, the individual working states can be queried, and the control of the tracks can be carried out. Such operating devices can communicate wirelessly through infrared radiation, mobile radio, Bluetooth, or the like.

It is preferably provided that it is simultaneously monitored, through the pressure sensor and/or the inclination sensors, that a force vector, acting on the push column from the base body of the track, for the transfer of the load, preferably extends along the longitudinal axis of the push column, however at least inside the push bodies of the push column. As a result, a stable positioning of the track in a working position, which is raised compared to the basic position is made possible, regardless of whether the working position is taken by an only partially extended push column or a fully extended push column.

Furthermore, it is provided that the two tracks forming the tracked lifting platform are oriented parallel to one another and are equipped without intermediate stiffening members. Thus, the at least two tracks are mechanically decoupled from one another. As a result, a maximum accessibility into the working chamber of the tracked lifting platform can be provided. However, for the simultaneous lifting and lowering of the at least two tracks, the synchronization control is provided, which correspondingly controls and synchronizes the drives.

Preferably, only lifting mechanism that comprise a push column with multiple push members engage on each track of the tracked lifting platform. Furthermore, preferably, the two parallel and spaced tracks, which form a tracked lifting platform, are arranged in a manner uncoupled from one another. They therefore not comprise any mechanical connection between them. The lifting mechanisms, which comprise a push with multiple push members, can lift and lower the track and, at the same time, form a guidance of the track when lifting and lowering the track. Additional guiding elements, such as a semi-scissors, a double-scissors, or other types of guides, which are mounted on the track in addition to the lifting mechanisms, are not required. Just as well, two parallel and spaced tracks can be provided without coupling. As a result, the formed interspace between the tracks is freely accessible, so that free access is provided both with lowered tracks and lifted tracks. Preferably, the tracks are formed without guidance, and are only guided during the lowering and lifting by the lifting mechanisms.

The object underlying the invention is furthermore achieved by means of a lifting mechanism, in particular for a tracked lifting platform, which (comprises) a lifting column with at least two adjacent push members oriented in the longitudinal direction of the push column, which are pivotable to one another by at least one deflection axis between at least two push members, so that the push members are pivotable in one direction and, in the opposite direction, are arrangeable in a pressure-resistant manner by the push bodies of the push members stacked one on top of the other. Each push member comprises at least one support contour perpendicularly to the longitudinal direction of the push column, which, starting from a rear wall on the push body, preferably extends in a helical manner in the opposite direction of the pivoting direction. As a result, a particularly pressure-resistant push column can be realized, so that for the lifting of such tracks, exclusively the formation of a push column is sufficient, in order to lift e.g. busses, trucks or the like. By the configuration of the push bodies through a helical support contour, a simple and particularly pressure-stable push column can be formed. The push members preferably are formed in a manner as to be secured against tilting relative to one another in the direction of the deflection axis.

It is preferably provided that the deflection axis is formed, between two push members, by one or multiple articulated axle/axles, which includes one or multiple articulated connection elements, which positions the two push bodies in an articulated manner to one another. This is a simple constructional design in order to line-up the push members to form a push column in a connected manner. In particular, a deflection from a retracted position, which is mostly horizontally oriented, into an extended position, which is mostly vertically oriented, can be done.

An alternative configuration of the deflection axis between at least two push members is formed by a belt. According to one embodiment, the individual push members are fixedly arranged on the belt or connected thereto. Alternatively, these push members can be coupled into or out of the belt during a retracting or extending movement into or out of the deflection device. The belt also forms a pivot axis between two directly adjacent push members. Thus, they can be disposed one on top of the other in a pressure-resistant manner in a vertical arrangement, and be deflected in a retraction or extension movement. Preferably, the push members are coupled to or connected to the belt in the central region with respect to the height or thickness of the push members.

Furthermore, it can alternatively be provided that the deflection axis is formed by a guide path of the deflection device. In this embodiment, the push members can be lined-up in a loose manner. Thus, the individual push members are not fixedly connected with one another. The guide path thus forms a deflection for two neighboring push members, wherein this deflection axis is disposed outside the push members and represents a virtual axis then.

The safety device of the push column preferably comprises a clamping device, which is assigned to the push members and extends along the push members, and is assigned to the deflection axis opposite the push bodies. In particular in not fixedly connected push members, this makes it possible that these members are arranged one above the other and clamped with one another during a transition into a vertical position, so that a push column is formed that is stable with respect to an acting lateral force and/or a lifting force. This clamping element can also be provided in push members which are fixedly connected to one another, in particular by a joint or by a belt or the like.

The clamping device can preferably comprise a force and/or displacement sensor. The said sensor can be provided directly on or at the clamping device, or between the clamping device and a push member.

Furthermore, it is preferably provided that the clamping element extends parallel and lengthwise to the longitudinal direction of the push column and preferably is also deflectable in one direction of the push members. As a result, this clamping element can be displaced at the same time with the push members of the push column during the retraction and extension. Since always the same number of push members is in the deflection, length variations between the push members to the parallelly-running clamping element do not exist. This achieves a compact arrangement with a simple structure.

It is preferably provided that the clamping device comprises a clamping element, in particular a pulling cable, a chain, or a belt. All of these clamping elements are configured to be non-flexible in regard to a tensile stress, i.e. are formed in a highly-tensile-proof manner. This allows a fixed stacking of the individual push members one above the other. Preferably, a pre-tensioning element can be provided between the clamping element and a push member, or an application point of the clamping element on the push column, by means of which the acting tensile stress can be set.

Another preferred embodiment of the push mechanism provides that the belt is guided in or parallel to the guide path of the deflection device, and preferably is made of a tensile-proof material. This allows a flat arrangement for the forming of a lifting column.

Furthermore, it is preferably provided that the push members are coupled with a clamping element of the clamping device during an extension movement, which clamping element engages on or is assigned to a push member, opposite the deflection axis. As a result, the clamping element can be guided towards the push members from outside, and be coupled-in or fixed thereon during an extension movement. The clamping element is thus supplied in the opposite direction of the deflection direction of the push members during a retraction and extension movement of the push column, and is provided for the pressure-resistant arrangement of the push members.

For the formation of the helical support contour, the push bodies of the push column preferably comprise two stiffening portions, which are preferably formed trapezoid or unilaterally trapezoid or semicircular, and comprise a web portion between the stiffening portion, in which the at least one latch element can be provided. As a result, the push body can be formed in the type of a helix, in a plan view.

The stiffening portions of the push members preferably extend across the entire height of the push members and respectively comprise pressure surface portions at the face side toward the neighboring push member. As a result, a load transfer can be effected in a simple manner, and the compressive rigidity of the chain be formed.

The push members of the push column preferably comprise a push body, in which in each case one tab is laterally arranged, which comprises joint holes for two joint connection elements, spaced in parallel one relative to the other in longitudinal direction of the push column, for the connection of neighboring push members. These tabs allow a simple constructional design of the push members. They are preferably formed in the type of a plate and, for example, are attached on the push body by means of a screw connection.

It is preferably provided that the respective longitudinal axis of the push member is formed by two separately arranged joint connection elements lying in the joint axis. This can create construction space in order to accommodate the supply lines and/or the clamping device, for example.

Furthermore, on each outer side of the joint connection element, in each case one roll, or sliding body, is provided for being guided in a deflection direction and/or guidance. As a result, a smooth and exact guidance of the push column in or on the base body of the track can be provided.

Furthermore, it is preferably provided that the tabs, which are arranged on the push body, or end faces of the push bodies oriented toward the chain longitudinal direction, comprise protrusions in the longitudinal direction of the push column, which project above the height of the push body and comprise, opposite and counter to the longitudinal direction of the push column, recesses, in which the protrusions of the neighboring push member engage in a pressure-resistant arrangement of the push column. The protrusions additionally serve to laterally guide the push members, so that these members are disposed one above the other in a defined position in the longitudinal direction of the lifting column, and allow a secure load transfer.

Furthermore, it is preferably provided that the lined-up push members of the push column are supported on opposite support surfaces of roll-off surfaces of the push bodies during the deflection. It is preferably provided that, during the deflection phase, an as small as possible friction is generated by the deflection device. This is, in particular, effected by a rolling-off and/or sliding over one another.

Alternatively, it can be provided that instead of the support surfaces or roll-off surfaces, the push members are connected to one another by at least one joint connection member, so that a joint connection exists between the push members, so that by a sliding movement, the push members are received and deflectable in a manner pivotable to one another.

Another preferred embodiment of the push column provides that the push members, in particular the push body, is formed as a sheet metal structure, as a cast part, as a forged part, as a plastic or plastic composite part, or as an extruded profile or a 3D-printed component made of plastics or metal. The selection of the material can be effected dependent upon the construction space and also under cost aspects.

Figure 2:
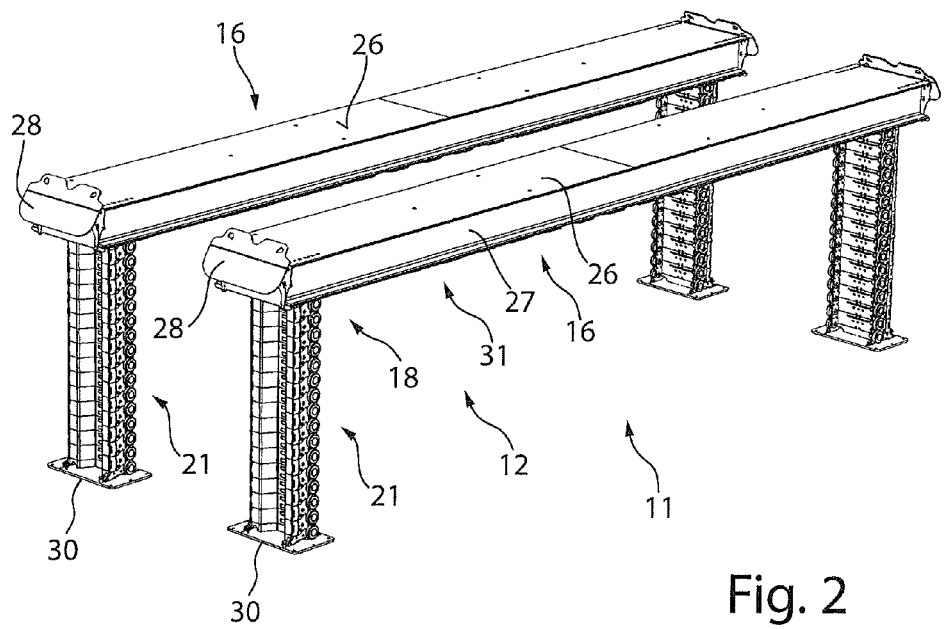
Figure 3:
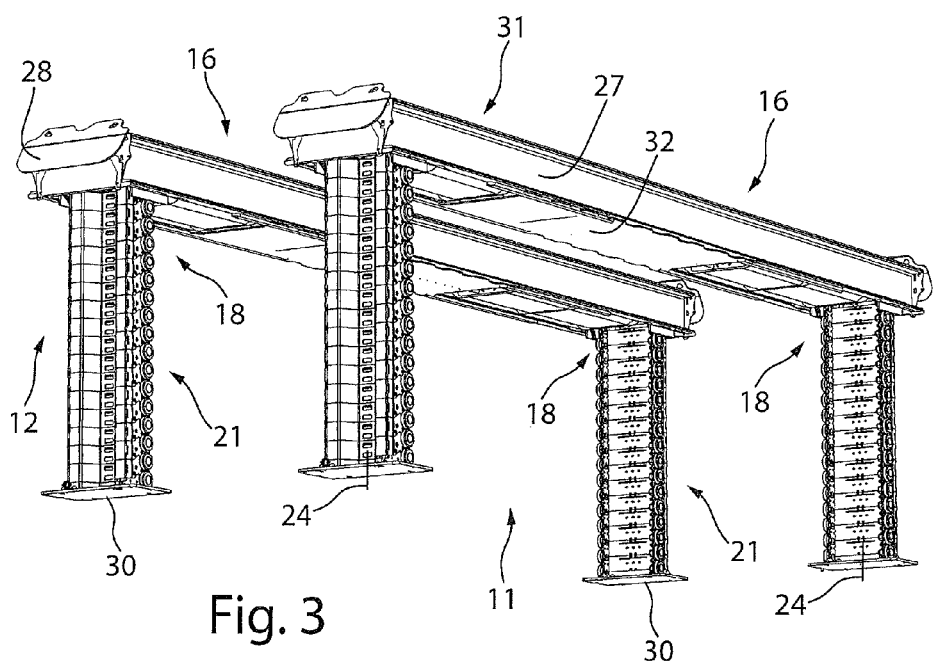
Figure 4A:
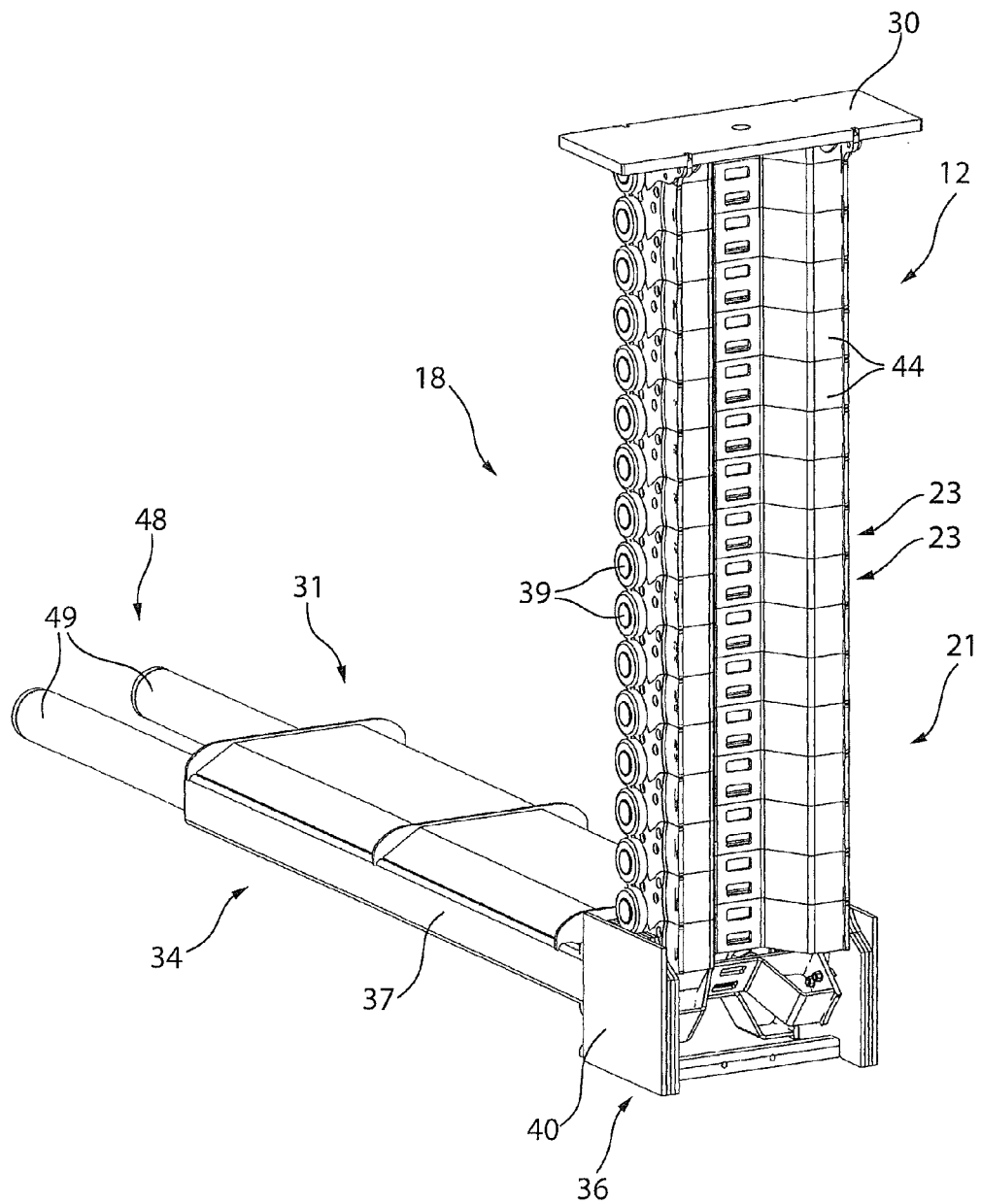
Figure 4B:
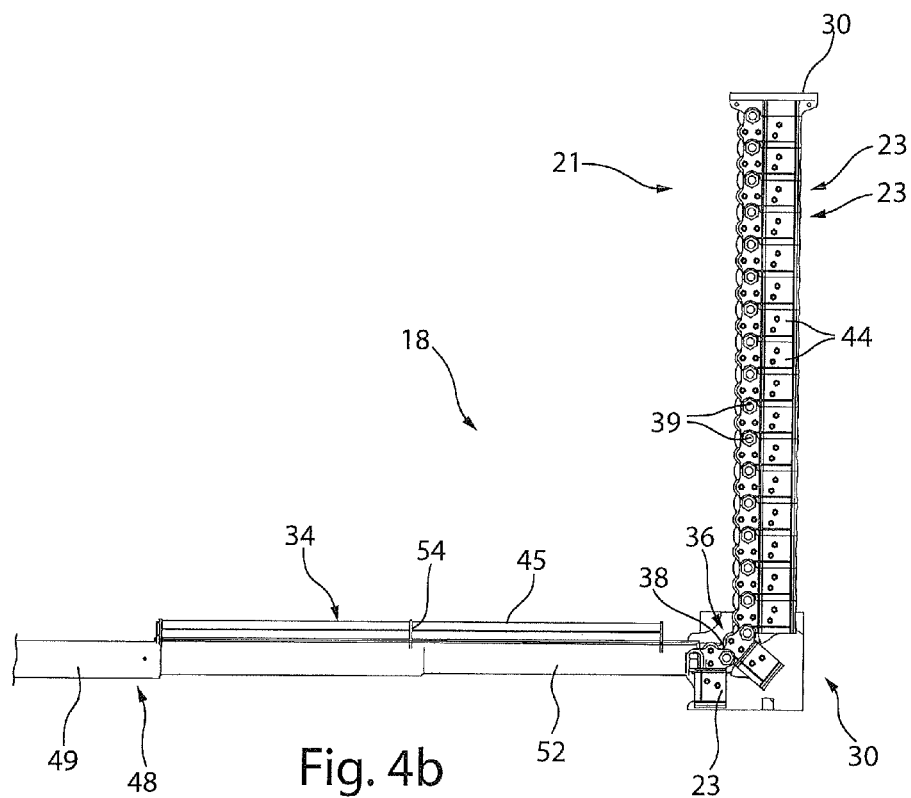
Figure 5:
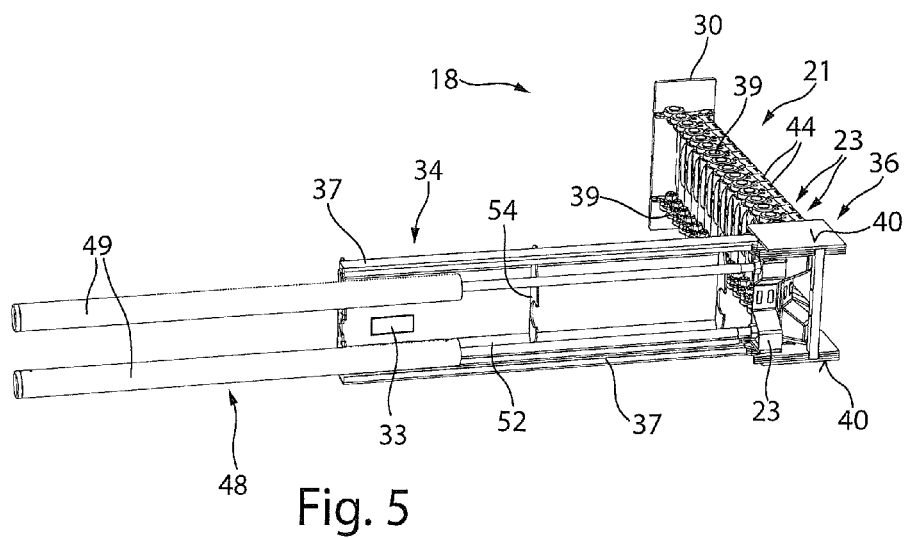
Figure 6:
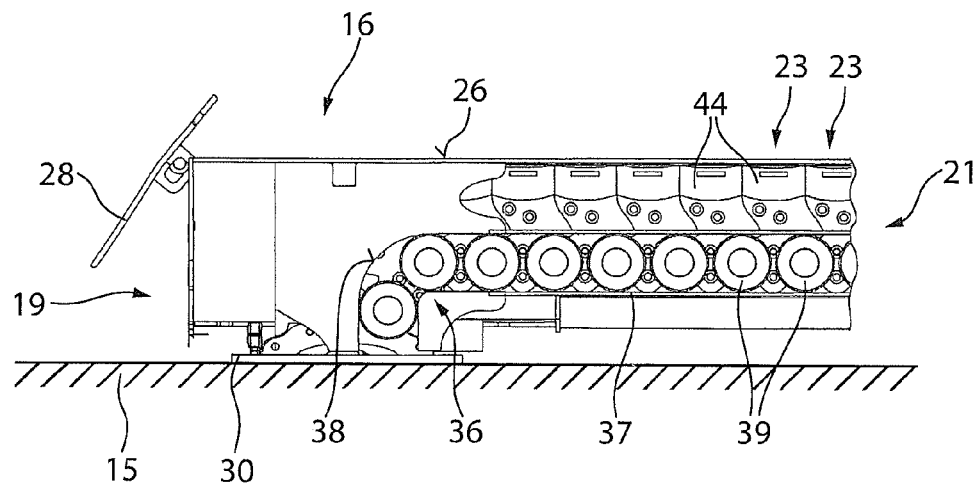
Figure 7:
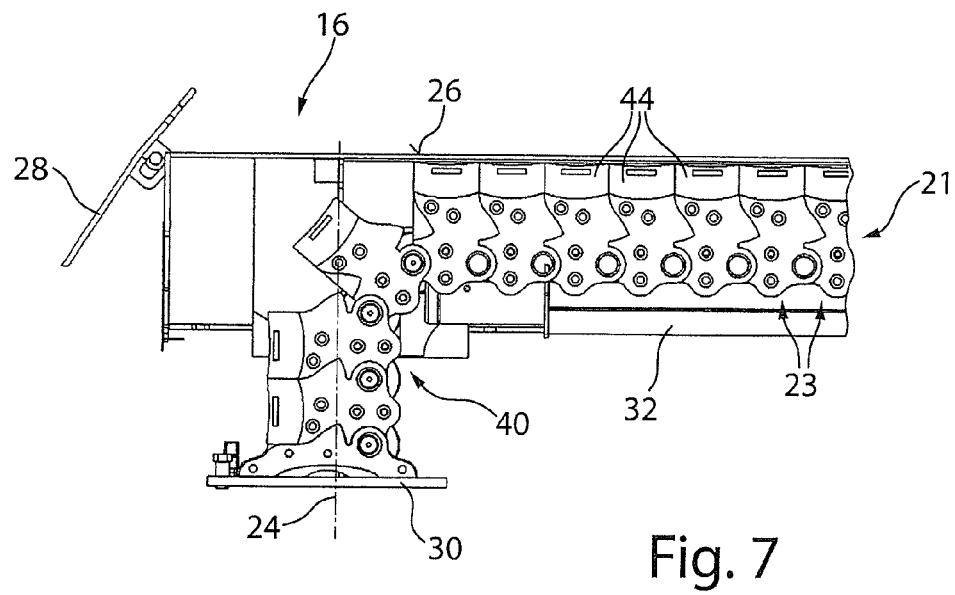
Figure 11:
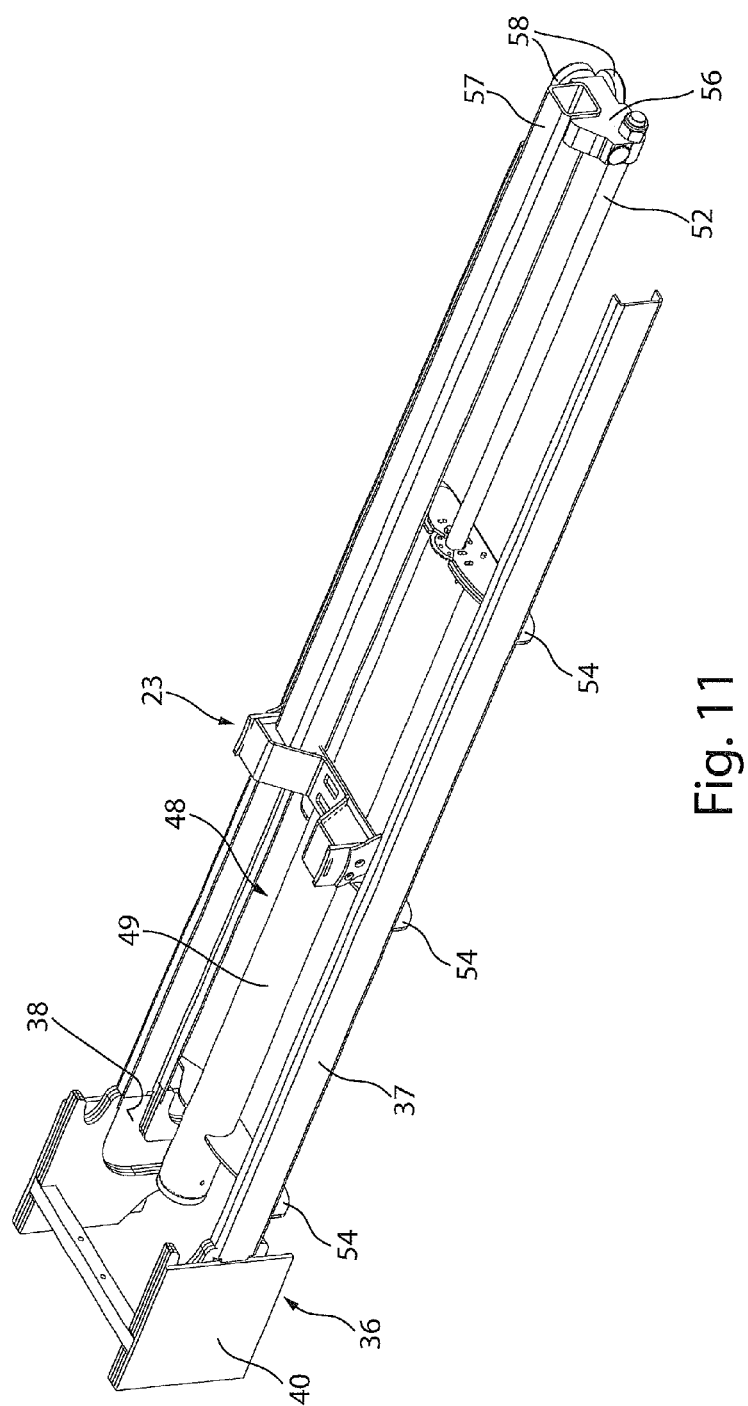
Figure 12:
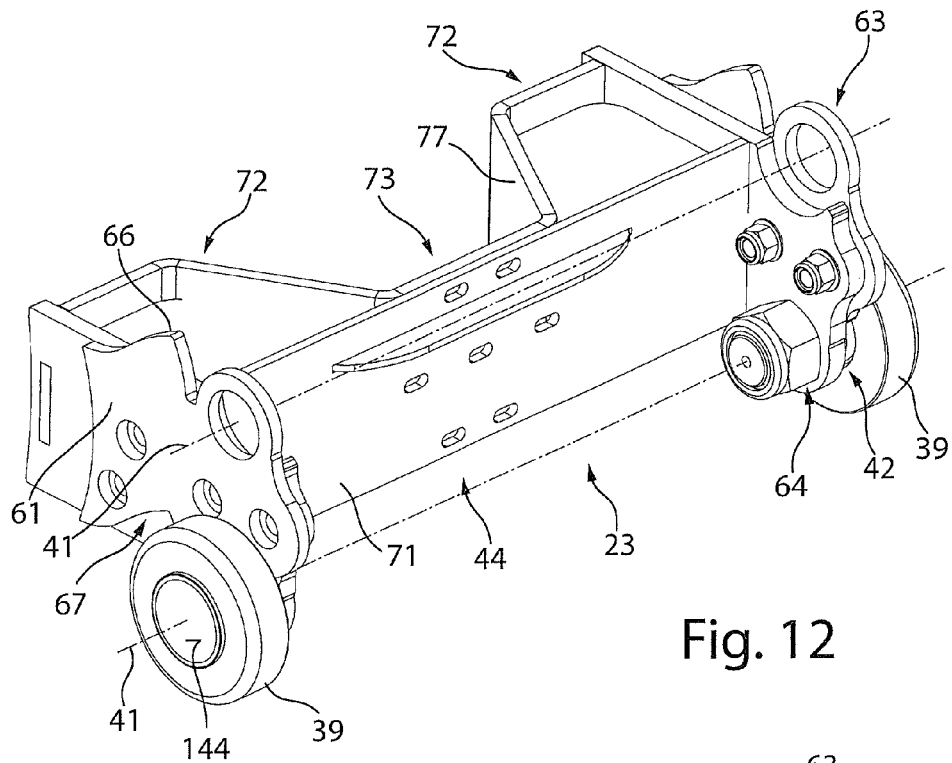
Figure 13:
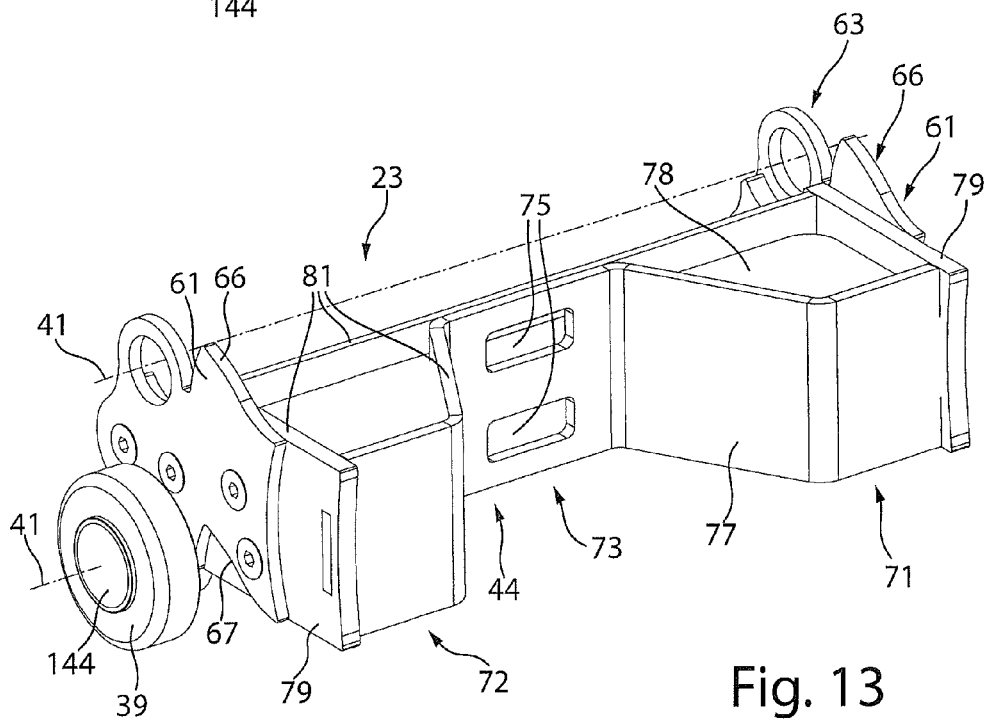
Figure 14:
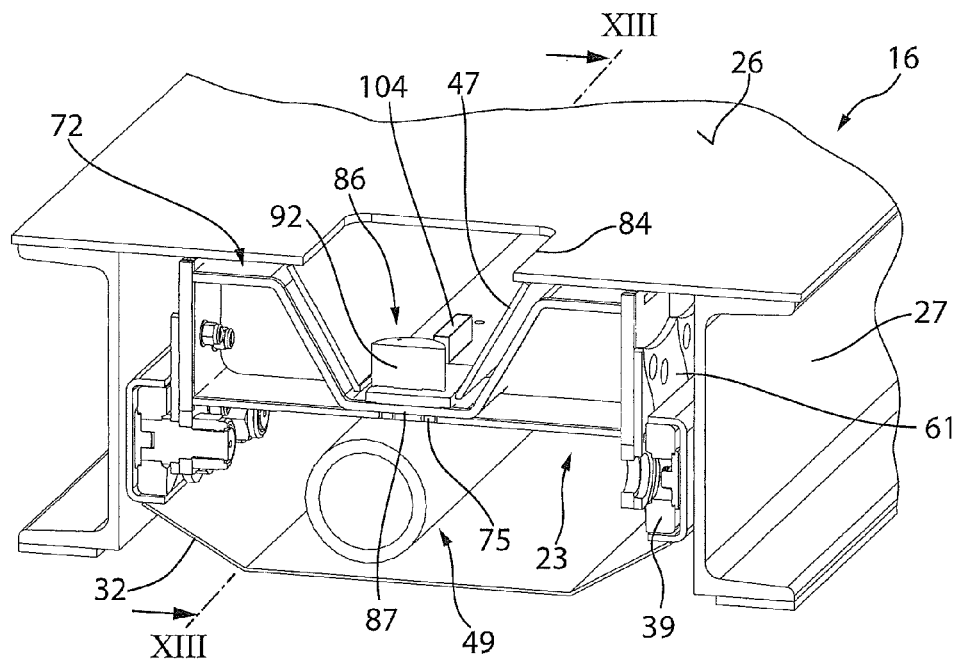
Figure 15:
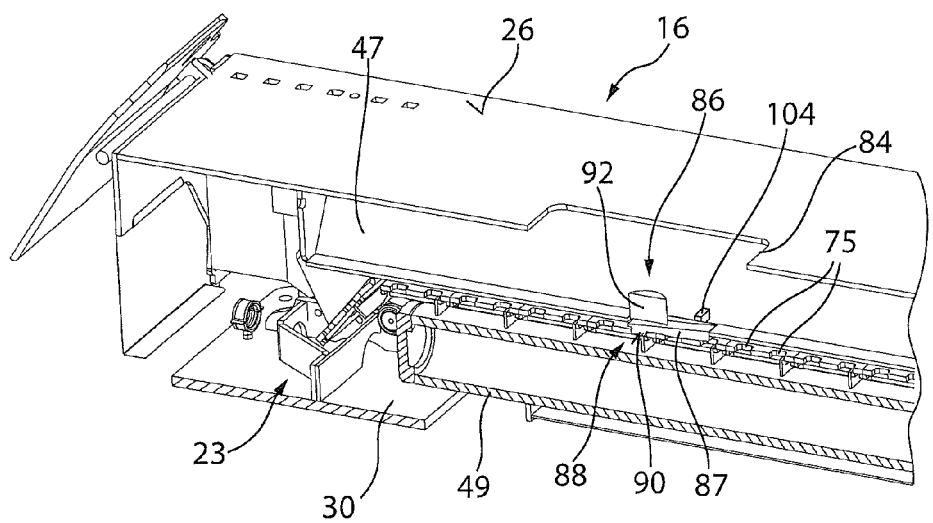
Figure 16:
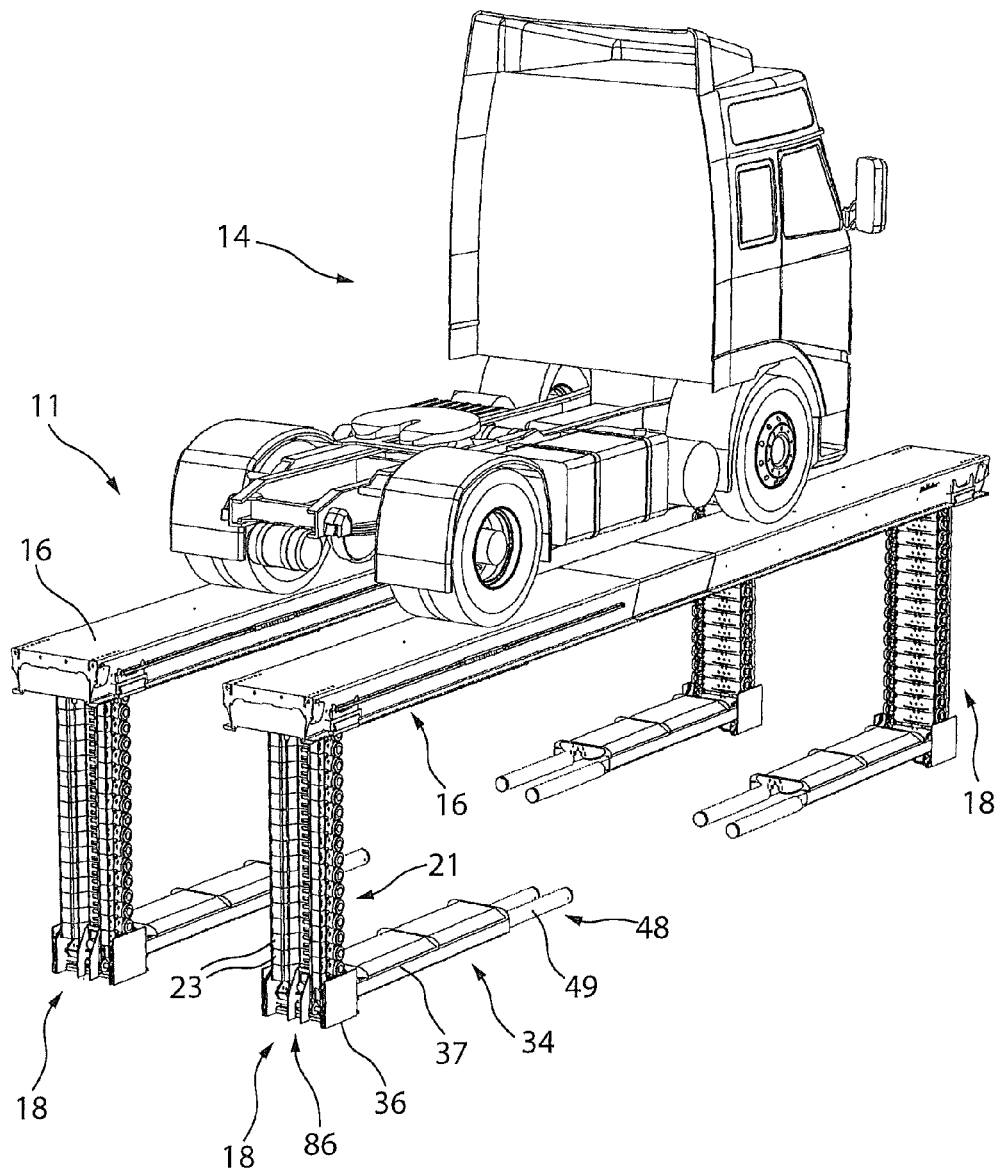
Figure 17:
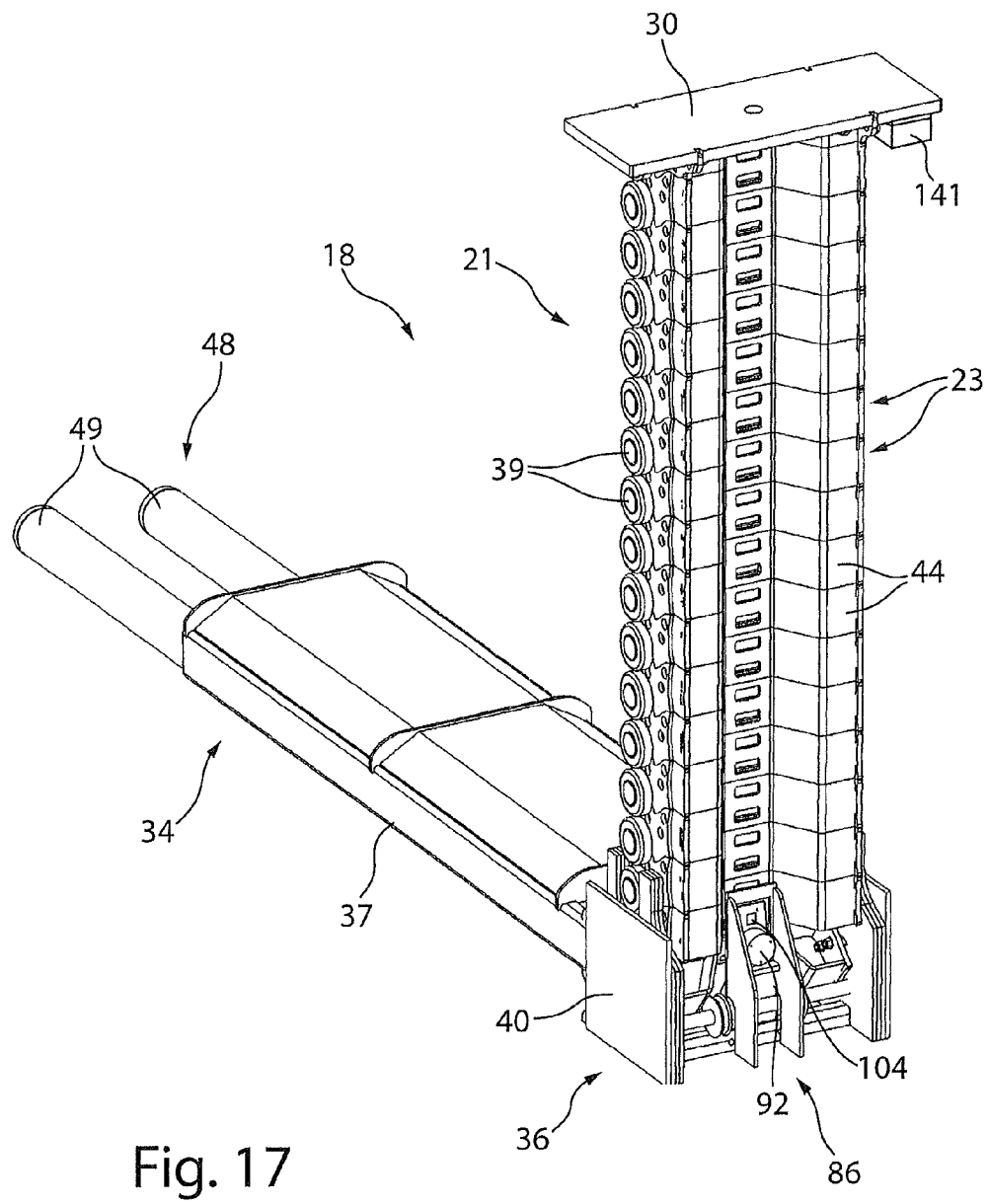
Figure 18:
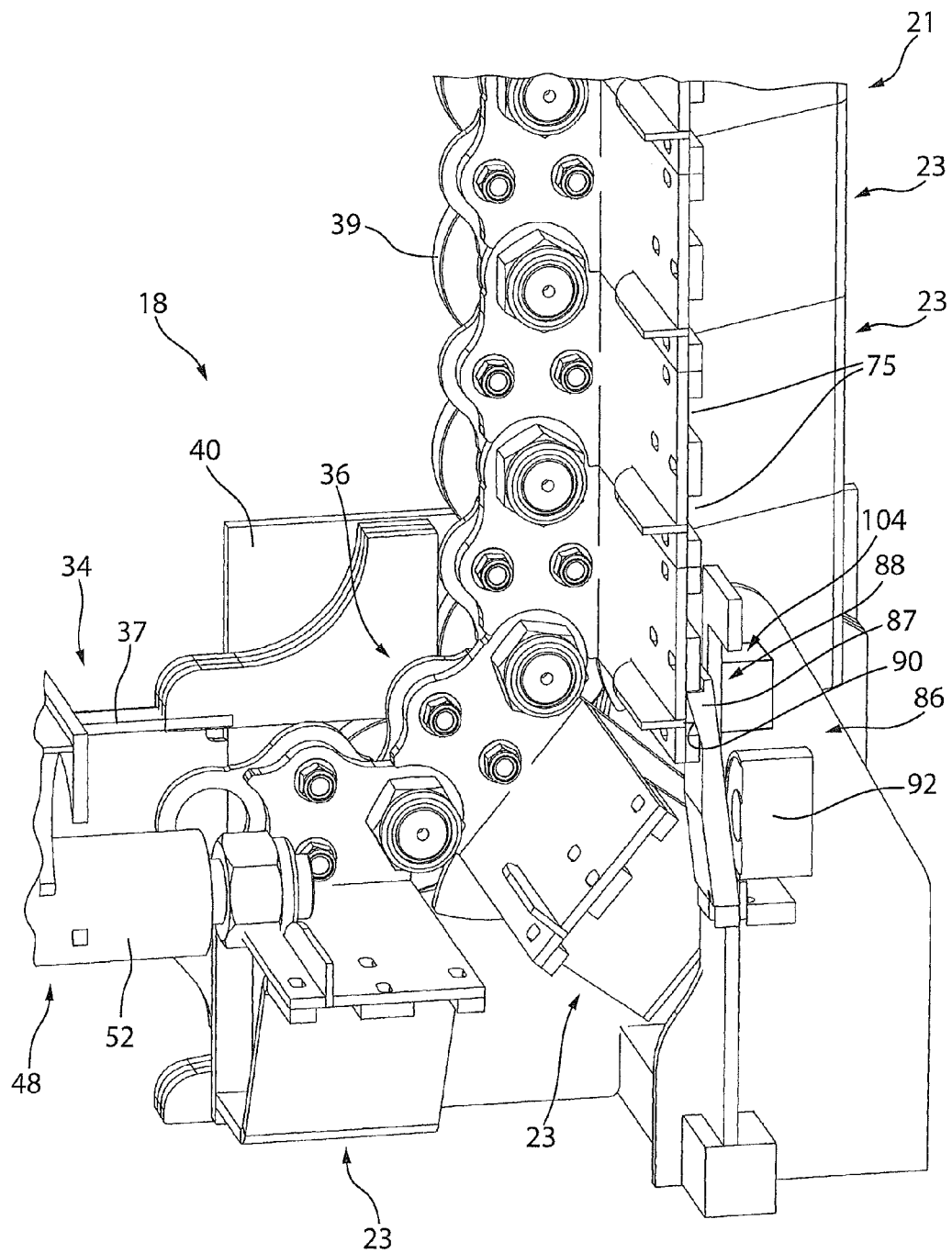
Figure 19:
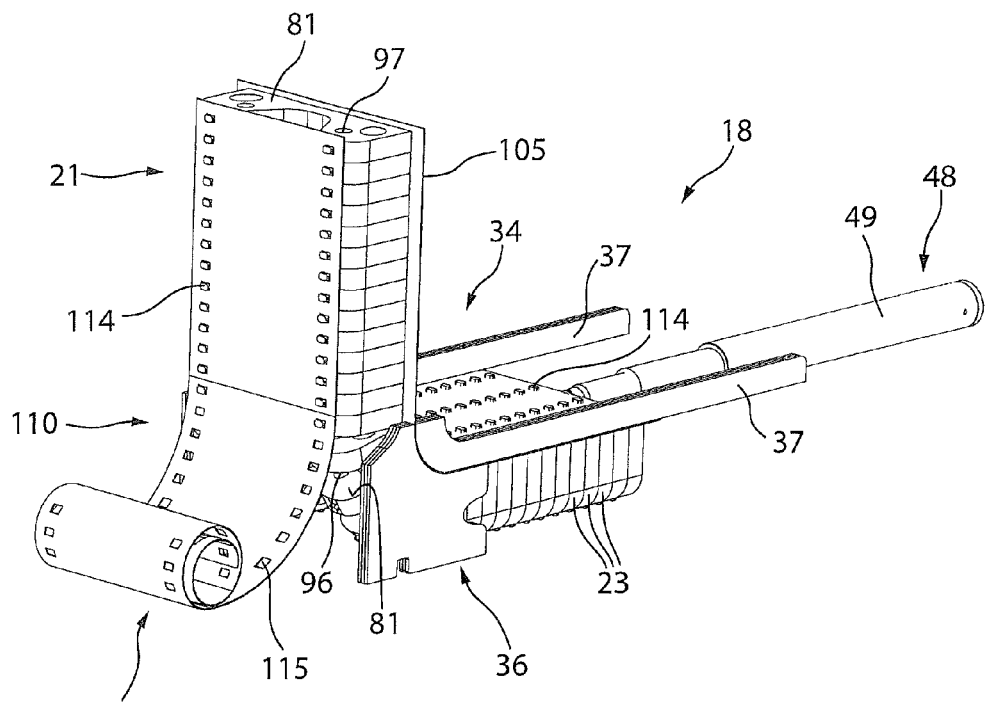
Figure 20:
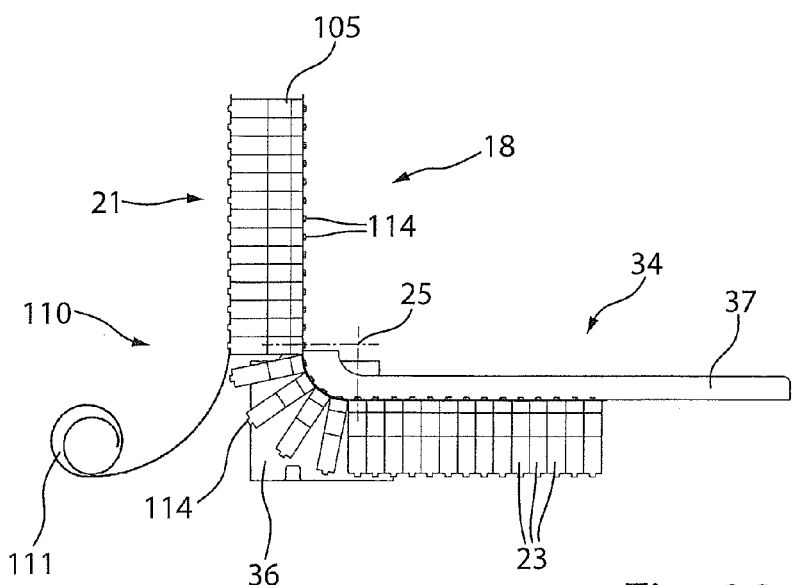
Figure 21:
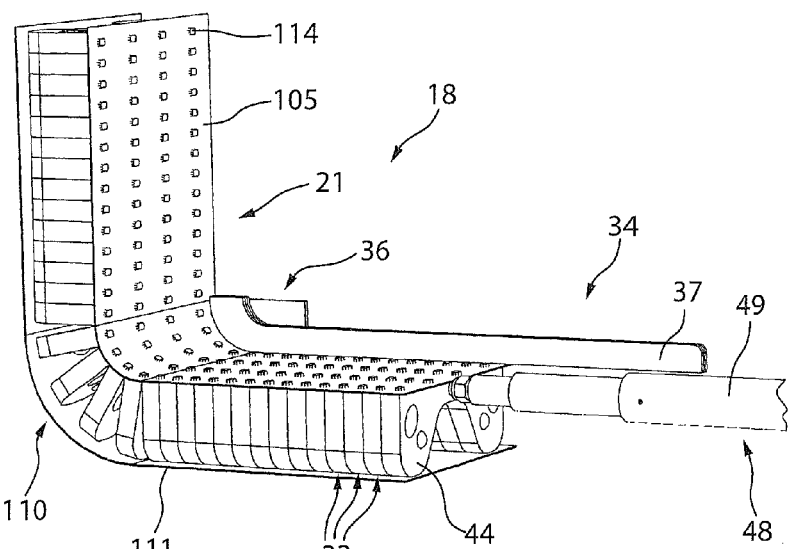
Figure 22:
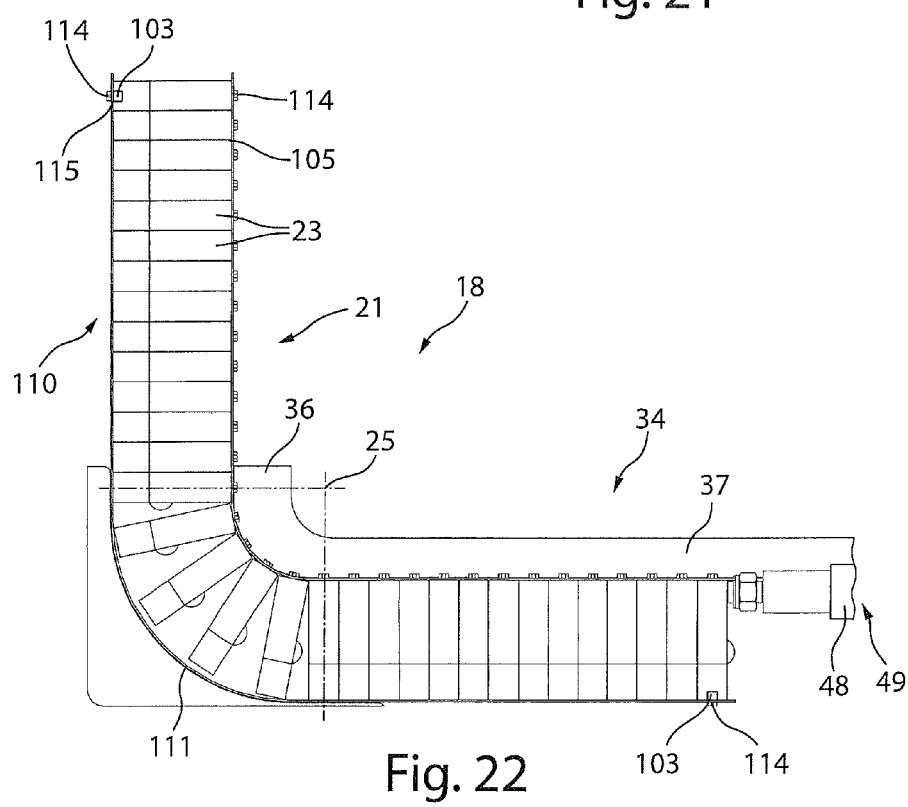
Figure 23:
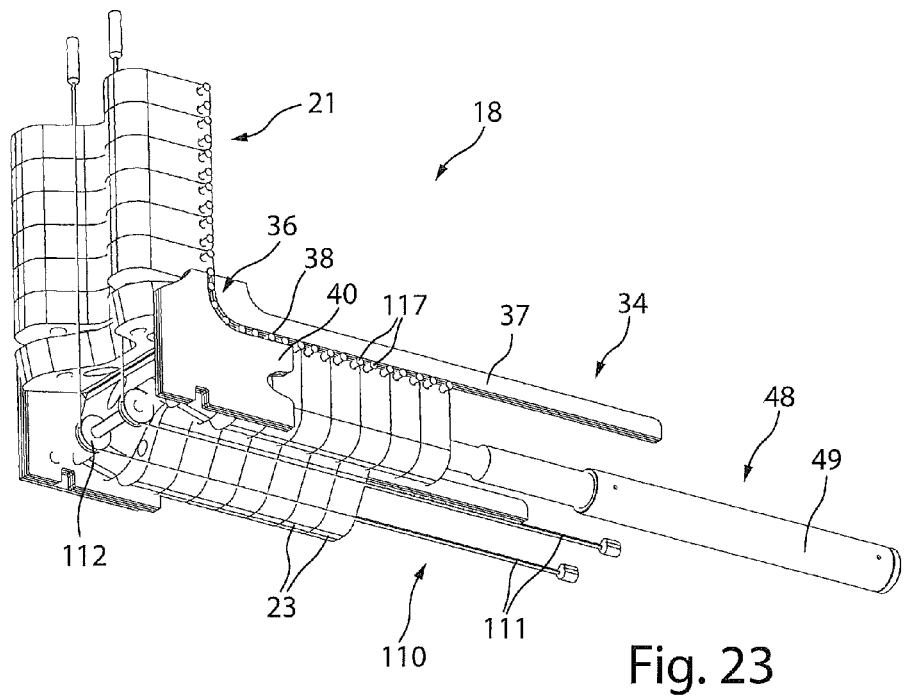
Figure 24:
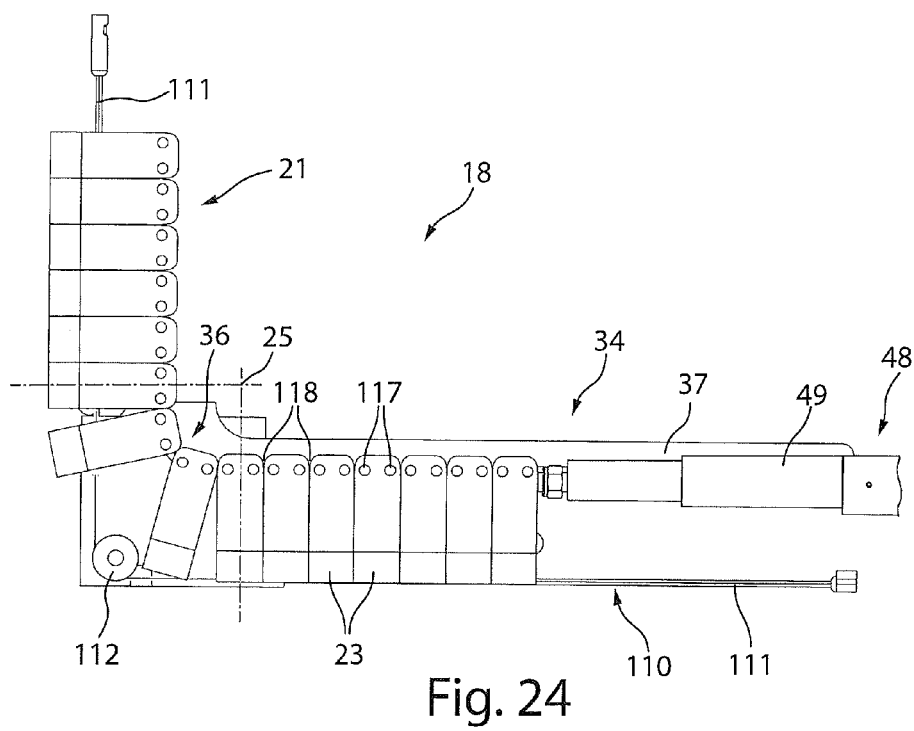
Figure 25:
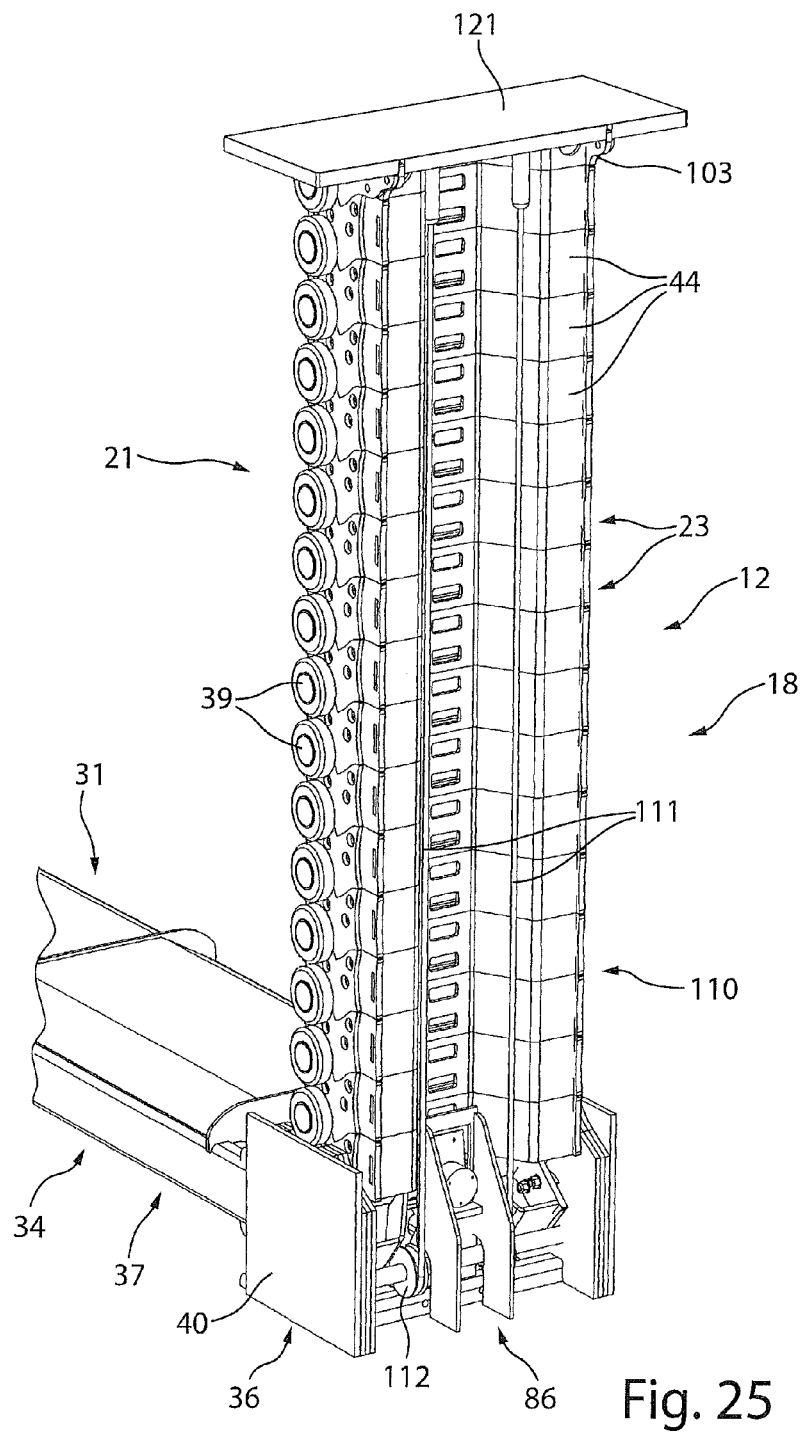
Figure 26:
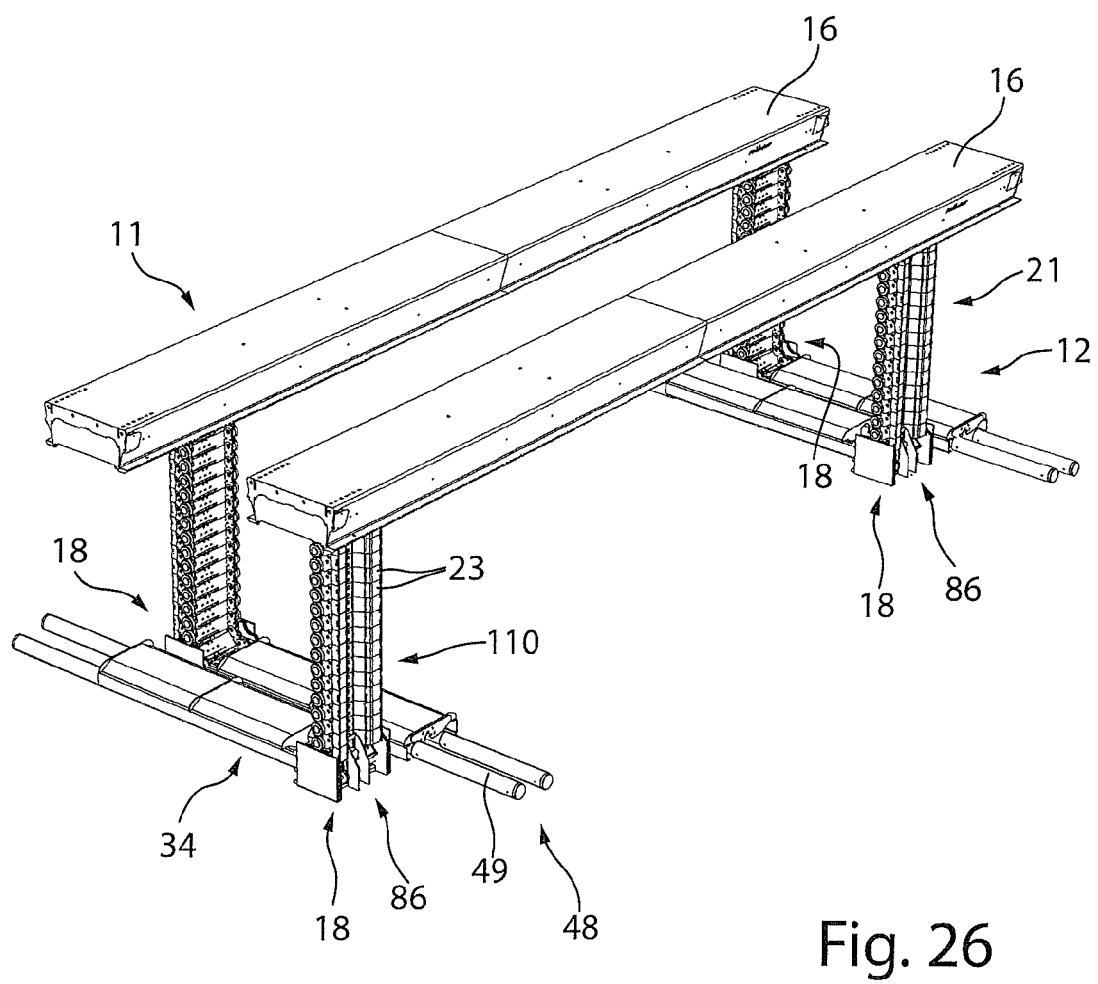
Figure 29:
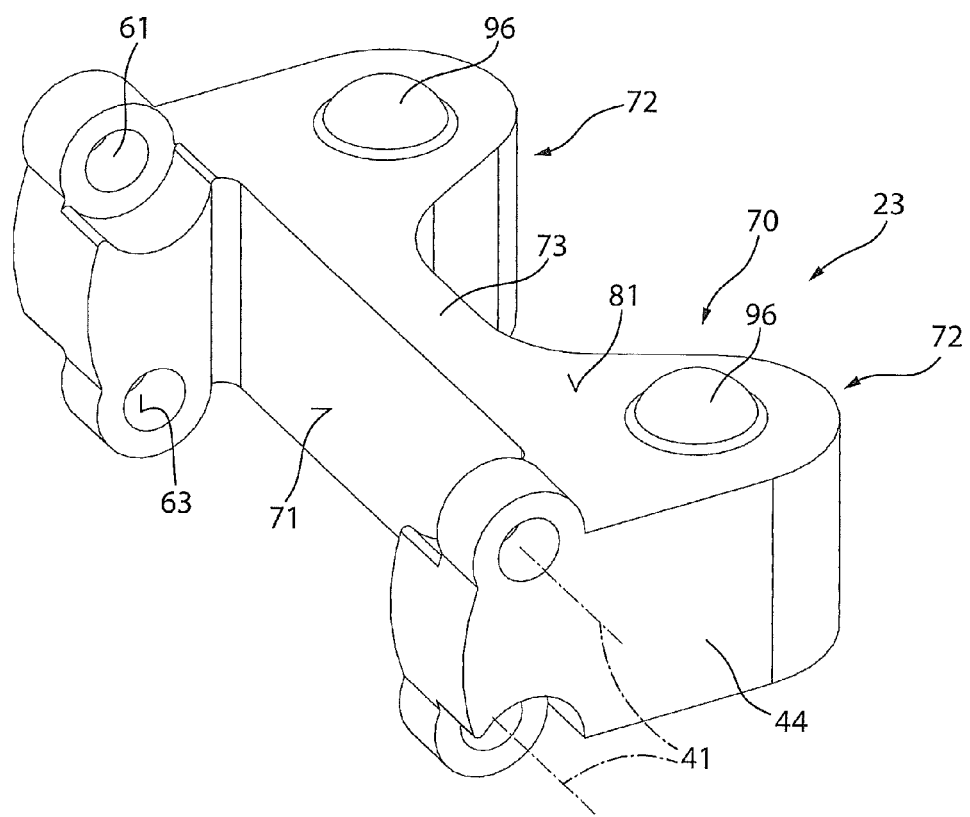

The invention as well as further advantageous embodiments and developments of the invention are described and explained in more detail hereinafter based upon the examples shown in the drawings. The features resulting from the description and the drawings can each per se or in any combination be used in accordance with the invention. The Figures show in:

FIG. 1 a perspective view of the tracked lifting platform according to the invention with a vehicle in a working position;

FIG. 2 a perspective view obliquely from above on to the tracked lifting platform in the working position;

FIG. 3 a perspective view obliquely from below on to the tracked lifting platform in the working position;

FIG. 4a a perspective view of a lifting mechanism for the tracked lifting platform according to FIG. 1;

FIG. 4b a schematic side view of the lifting mechanism according to FIG. 4a;

FIG. 5 a schematic view from below on to the lifting unit according to FIG. 4a;

FIG. 6 a schematic lateral view in a partial section of an end region of the track in a basic position;

FIG. 7 another schematic view of an end region of the track in an almost retracted position;

FIG. 8 a schematic side view in a full sectional view of the track;

FIG. 9 a schematic view from above on to the track with the running surface removed;

FIG. 10 a schematic view from above on to the track in another alternative view to FIG. 8;

FIG. 11 a perspective view of a drive of a lifting mechanism of the track;

FIG. 12 a first perspective view of a push member of a push column;

FIG. 13 a second perspective view of the push member of FIG. 12;

FIG. 14 a perspective sectional view along the Line VI-VI in FIG. 8;

FIG. 15 a perspective view of a longitudinal section in the end region of the track;

FIG. 16 a perspective view of an alternative embodiment of the tracked lifting platform with respect to FIG. 1;

FIG. 17 a perspective view on to the lifting unit with an alternative locking with respect to FIG. 14;

FIG. 18 a schematic sectional view of the locking device according to FIG. 17;

FIG. 19 a perspective view of an alternative embodiment of a lifting mechanism with respect to FIGS. 4a and 4b;

FIG. 20 a schematic side view of the lifting mechanism according to FIG. 19;

FIG. 21 a perspective view of an alternative embodiment of the lifting mechanism with respect to FIG. 21;

FIG. 22 a schematic side view of the lifting mechanism according to FIG. 21;

FIG. 23 a perspective side view of another alternative embodiment of the lifting mechanism with respect to FIG. 19;

FIG. 24 a schematic side view of the lifting mechanism according to FIG. 23;

FIG. 25 a perspective view of the lifting mechanism with a safety device;

FIG. 26 a perspective view of another alternative embodiment of the tracked lifting platform with respect to FIGS. 1 and 16;

FIG. 27 an alternative embodiment of a push column with respect to FIG. 12;

FIG. 28 a perspective view of a push member of the alternative push column according to FIG. 25; and FIG. 29 another alternative view of the push column according to FIG. 27;

FIG. 1 shows in a perspective view a tracked lifting platform 11 according to the invention in a working position 12, in which a vehicle 14 is lifted in relation to a ground. The tracked lifting platform 11 includes two, preferably parallel extending tracks 16, onto which the vehicle 14 can enter, and be lifted in the working position 12. The working position 12 preferably includes a height, in relation to the ground, so that maintenance work, repairs, and/or inspections can be done below the vehicle.

At least two lifting mechanisms 18 are provided on each track 16, in order to transfer the track 16 from the basic position 19 (FIG. 4) into the working position 12. In the basic position 19, the track 16 can rest on the ground and, for example, a vehicle 14 can enter on top of it. Likewise, in the basic position 19, the track 16 may be lowered into the ground and be flush with said ground. Just as well, the track 16 can be lifted in relation to the ground with a small distance, in the basic position 19. The lifting mechanism 18 includes a push column 21 and a drive 48, which, for example, is shown only partially in an embodiment in FIG. 9. The lifting mechanism 18 is provided on each end region of the track 16. Additionally, one or more lifting mechanisms 18 can be provided between them. The push column 21 is configured in a pressure-resistant manner. This pressure-resistant push column 21 comprises multiple push members 23, which are connected to one another in an articulated manner, which are yet to be explained in greater detail hereinafter. When oriented along a longitudinal axis of the lifting column 21, the push members 23 are resistant to pressure. As a result, it is possible that the push members 23, which are located one above the other, form a vertical column, on which the track 16 is supported.

The track 16 comprises a tread 26 as well as lateral jaws 27. An access aid 28 is provided on each respective face side of the track 16. The track 16 can have a construction as described in EP 2 531 437 A1, for example, to which reference is hereby made in its entirety.

A base plate 30 is provided on one end of the push column 21, by means of which the track 16 is fixed, e.g. stationary, by a screw connection on a ground, e.g. of a workshop. An opposite end of the push column 21 is preferably guided in a base body 31 of the track 16, which is formed by the tread 26, the lateral jaws 27 and, as the case may be, the base plate 32.

In this embodiment, the further units such as an electric control unit and/or drive unit and/or accumulators are integrated in the track 16.

FIG. 2 shows the tracked lifting platform 11 in the working position 12, without vehicle. It can be seen here that each track 16 is separately held in the working position 12, in relation to the neighboring track 16, by the two push columns 21. Additionally, a jacking beam can be displaceably received between the tracks 16.

FIG. 3 shows a perspective view of the tracked lifting platform 11 of FIG. 2 in the working position 12, from below. It can be discerned here that a compact design is provided when configuring the lifting element 20 as a push column 21. Additional mechanical components, outside the vertical columns formed by the push column 21, are not provided on the track 16.

FIG. 4a shows a perspective view and FIG. 4b shows a schematic side view of the lifting mechanism 18, and FIG. 5 shows a perspective view of the lifting mechanism 18 from obliquely below.

This lifting mechanism 18 includes a support structure 34, which consists of at least one deflection mechanism 36 and a guidance 37 arranged thereto. The push column 21 is displaceably guided by the deflection device 36 and the guidance 37. It is preferably provided that the guidance 37 is horizontally oriented in an installation situation. The deflection device 36 allows a deflection of the push column 21 by 90°, so that the push column 21 is transferred from a horizontal position into a vertical position. The lifting mechanism 18 can also comprise a drive 48 to activate the retraction- and extension movement of the push column 21. In the exemplary embodiment of FIGS. 4 and 5, two hydraulic lifting cylinders 49 are shown as a drive 48, which engage on a push member 23 of the push column 21. Alternatively, only one lifting cylinder 49 can be provided. Further alternatives will yet be explained in the following.

The guidance 37 advantageously consists of U-shaped and C-shaped profiles, in which track rollers 39 of the push members 23 are guided. The deflection device 36 directly adjoins the guidance 37 by means of a guidance path 38, in order to create a deflection motion by 90°. The guidance path 38 can be formed as a groove-shaped depression in the lateral jaws 40, which are held at a distance by struts or the like. The guidance 37 is fixedly connected to the deflection device 36. Additionally, the guidance 37, which consists of two guidance rails, can be held at a distance by transversal struts 54. Just as well, the drive 48, in particular a housing of at least one lifting cylinder 49, can be fastened on these transversal struts 54.

The lifting mechanism 18, consisting of the support structure 34 and the lifting column 21, is formed as an installation module. This installation module can be supplemented by a drive 48, so that the lifting mechanism 18 is formed as one unit, consisting of the push column 21, the support structure 34 and the drive 48.

Such a lifting mechanism 18 can cooperate with a track 16 in such a way that a tracked lifting platform 11 is formed in accordance with the embodiments in FIGS. 1 to 3. In this embodiment, the support structure 34 in integrated in the base body 31 of the track 16.

When mounting the lifting mechanism 18 in the track 16, the at least one lifting cylinder 49 can also be arranged in the support structure 34 in a manner turned by 180°. For example, one end of the housing of the lifting cylinder 49 directly engages on the first push member 23 of the push column 21, and a free end of the piston rod 52 is fixedly connected to the support structure 34 or the track 16. In such an arrangement, the housing of the lifting cylinder 49 is displaceably accommodated in the support structure 34.

The above described arrangement provides the advantage that the supply lines, such as at least one hydraulic line and/or power supply line and/or data line can be guided adjacently to the push column 21 or inside the push column 21, in particular inside the push bodies 44. As a result, a compact arrangement can be created, since a relative movement between the connection points on the housing of the lifting cylinder 49 and the first push member 23 directly driven by the lifting cylinder 49 is not provided.

FIG. 16 describes an alternative embodiment of the tracked lifting platform 11.

FIG. 6 shows a first schematic sectional view of an end region of the track 16 in the basic position 19. The push column 21 is completely retracted in the basic body 31, or completely received by the basic body 31, so that a base plate 32 of the track 16 either rests on the working ground or on the ground of the workshop, or is arranged close to the workshop ground, so that the vehicle 16 can enter the running surface 26 via the access aid 28 or a separate access aid.

In the end region of the track 16, the deflection device 36 of the support structure 34 is provided, adjoined by a guidance 37 in the direction towards the center of the track 16. The push members 23 of the push column 21 comprise track rolls 39 as guidance rolls, by means of which the push members 23 are deflected along the deflection device 36 from a horizontal guidance 37 into a working position in a vertical orientation, when lifting the track 16.

A first lifting phase of the track 16 from the drive position 19 of FIG. 4 in the direction of the working position of FIGS. 1 to 3 can be taken from FIG. 5. In this case, a sectional view is chosen, in which the track rolls 39 are omitted. As a result, it can be discerned that two adjacent push members 23 are connected to one another by an articulated axle 41 in a pivotable manner. In this articulated axle 41, a joint connection element 42 is provided, which also accommodates the track roll 39.

The push members 23 are arranged to be pivotable in one direction, and in the opposite direction, they are stacked one upon the other in a pressure-stable or pressure-resistant manner. This is shown by FIG. 5. This allows for a deflection of the push members 23, and the push members 23, which are vertically and horizontally lined-up in a row, are pressure-resistant. As a result, the vertically-oriented push members 23 can absorb the force acting on the track 16 by a vehicle 14. The horizontally aligned push members 23 can transmit a pressure force applied by the drive 48 for the lifting of the track 16.

In as far as the push column 21 is to be arranged to run into the base body 31 of the track 16, it can also be provided that the guidance 37 and the deflection device 36 as well as the drive 48 are separately and individually mounted in the base body 31.

FIGS. 6 and 7 show that the push column 21 is guided into the base body 31 through an opening 46 on a bottom side of the track 16 or of a base plate 32 in the base body 31, and is deflected by the deflection device 36 into a horizontal plane. Through the transferring of the individual push members 23 from the horizontal plane into the vertical orientation, as shown in FIG. 5, the track 16 is lifted and transferred into the extension position.

For the further illustration of the construction of track 16 with the push columns 21, FIG. 8 is a schematic side view of the entire track 16 with a removed lateral jaw 27. FIG. 9 shows a top view of the track 16 of FIG. 8, with a removed running surface 26 of the track 16.

FIG. 10 shows a view on to the track 16, in which the running surface 26 and a stiffening element 47 (FIG. 9) arranged above the push members 23 are removed. For a better understanding, the individual push members 23, which are guided in the horizontal direction, are likewise not represented.

In FIG. 8, the track 16 is shown in a basic position 19. The right and left lifting push 21 is completely received and retracted into the base body 31 of the track 16. As least a part of a drive 48 of the lifting mechanism 18 is arranged between the two inner ends of the push columns 21. This drive 48 makes sure that a pressure force is exerted on the respective inner end of the push column 21, whereby the track 16 is lifted. The at least one drive 48 is fixedly arranged in the basic body 31 of the track 16. By the introduction of the pressure force onto the end of the push column 21, the respective inner end of the push column 21 is moved towards the end region of the track 16, whereby the extension movement of the track 16 is controlled to. In this embodiment according to FIGS. 8 to 10, it is provided that the drive 48 is formed as a hydraulic lifting cylinder 49. A lifting cylinder 49 is provided for each push column 21. The lifting cylinders 49 act in the opposite direction. Additionally, they are arranged respectively adjacent to a longitudinal central axis 51 of the track 16. After that, a complete extension of the piston rods 52 can be made possible, and on the other hand, a short track can be provided by the lateral offset in relation to one another, which fulfills a required minimum lift.

FIG. 11 shows a perspective view of a drive 48 in accordance with FIG. 10 in greater detail. The drive 48 is driven with a controller, which is not shown in greater detail here. The lifting cylinder 49 is fixed to the support structure 34 or to the base body 31 by means of transversal struts 54, for example. The orientation of the piston rod 52 occurs toward the center of the track 16. On the free end of the piston rod 52, a receptacle 56 is provided, in which a pressure element 57, in particular a pressure rod, is fastened. The opposite end of the pressure element 57 acts upon the first push member 23 of the push column 21. Furthermore, preferably at least one guidance roll 58 is provided on the receptacle, which is guided along the guidance 37. The track rolls 39 of the push members 23 are preferably guided in this guidance 37. By this arrangement and orientation, it is achieved that a pulling force acts upon the piston rod 52 when lifting the guide track 16. The force of the piston rod 52 is transmitted to the push member 23 via the pressure element 57, so that the push member is moved in the direction toward the end region or towards the deflection device 36, respectively.

The drive 48 can also directly act on the first push member 23 of the push column 21, so that a pressure force acts upon the piston rod 52.

As an alternative, it can be provided that a transmission mechanism is provided between the free end of the piston rod 52 of the lifting cylinder 49 and the first push member 23, in order to reduce the high forces. Furthermore, it can be provided that a lifting cylinder 49 activates two push columns 21, wherein a transmission element is interconnected in order to engage on the respective inner end of the push member 23 of the push column 21. As an alternative, pneumatic cylinders can be employed. Furthermore, electric motors and transmissions can likewise be used, which directly engage on the push members 23 of the push column 21. Instead of a pneumatic cylinder, a bellows or the like can also be provided.

FIG. 12 shows a first, and FIG. 13 shows a second perspective view of a push members 23 of the push column 21. A tab 61 is respectively provided laterally on a push body 44. This tab 61 is formed as a plate, for example, in particular as a punched part or a laser part, and connected to the push body 44, in particular screwed. The tab 61 comprises a first and a second joint hole 62, 63. As a result, a connection of an upper and lower neighboring push member 23 is possible by means of a joint connection element 42. The joint connection element 42 can also at the same time accommodate the track roll 39. The tab 61 comprise protrusions 66 projecting with respect to the push body 44. Opposite the protrusions 66, recesses 67 are provided on the tab 61. This makes it possible that the protrusions 66 of the one push member 23 engage into the recess 67 of the neighboring push member 23, whereby a lateral guidance of the push members 23 is made possible.

The track rolls 39 are preferably rotatably supported by the tabs 61. At the same time, the bearing axle of the tabs 61 forms a articulated axle 41, around which the push bodies 44 are mounted to be pivotable relative to one another. The track rolls 39 comprise sliding elements 144 on their face sides. These can be formed from plastic, for example, or from a slide-supportive metal material such as bronze. Such slide elements 144 serve as a lateral guidance on the guidance path 38 of the deflection device 36. Preferably, the slide elements 144 are supported on an inner wall of a side cheek 40 of the deflection device 36.

The push body 44 has a rear wall 71, by which the width of the push member 23 is determined. The track rolls 39 are held at a distance by the real wall 71. Trapezoid or unilaterally trapezoidal stiffening sections 72 extend on a side of the rear wall 71 opposite the joint holes 63, 64. A depression or recess is provided in-between, and a web portion 73 is formed. At least one latch element 75 can be provided on this web portion 73. This latch element 75 is formed, for example, by a punching of a stiffening sheet 77, which forms the trapezoidal stiffening portions 72 together with the rear wall 71. The height of the stiffening sheet 74 corresponds to the height of the rear wall 71. Side cheeks 79 are provided laterally to the rear wall 71, which receive, for example, the free ends of the stiffening sheets 77. The tabs 61 are also fastened to the side cheeks 79. Pressure surfaces or pressure surface sections 81 are formed on the upper and lower face sides of the push body 44, in particular of the rear wall 71 of the stiffening sheet 77 and the side cheeks 79. If the push bodies 44 are oriented along a chain longitudinal axis 24, these pressure surfaces or pressure surface sections 81 of the neighboring push bodies 44 bear one on top of the other, whereby a load transfer is made possible.

The push bodies 44 of the push member 23 according to FIGS. 12 and 13 are formed as a sheet metal part, which are produced by a punching and/or laser processing, and connected to one another. The stiffening sections 72 can be oriented transversally to the chain longitudinal axis 24, and can comprise the stiffening sheets 77, the lateral cheeks 79 and wall sections 78 stiffening the rear wall 71, by means of which the stiffening sections 72 are formed as a hollow body. The torsional stiffness can additionally be increased. These wall sections 78 can be adjacent to the upper and lower pressure surface or pressure surface sections 81 of the push body 44. Preferably, the individual sheet metal sections are connected to one another by plug and/or weld connections.

By the configuration of the push bodies 44 by means of the stiffening portions 72, it can also be provided that free spaces are formed inside the stiffening sections 72, along which supply lines for the track 16 are guided. These can be supply lines for the drive, such as pressurized air lines or hydraulic lines, for example. Just as well, electric lines or data transmission lines can be arranged therein, which supply further components of the track 16, such as light signals, sensors, radio modules, controls, in particular synchronization controls or the like.

FIG. 14 schematically shows a sectional view along line VI-VI on FIG. 8. FIG. 15 shows a lengthwise sectional view along line XIII-XIII in FIG. 14. The structure of the base body 31 of the track 16 can be seen from these sectional views, for example. The lateral cheeks 27 can be formed as U-shaped profiles, for example. The running surface 26 is supported on an upper leg of the U-shaped lateral cheek 27, for example. At a lower side, the base plate 32 can be fastened to the lateral cheeks 27. The guidance 37 is respectively fastened to an inner side of the lateral cheek 27. The guidance 37 is formed as a U-shaped or C-shaped guidance rail. Therein, the tracks rolls 39 of the respective push members 23 are guided. The lifting cylinder 49 is arranged between the push members 23 and the base plate 32, for example. The push members 23 are guided in the guidance 37 is such a way that the stiffening portions 72 are oriented vertical upward on the push body 44 of the push members 23. As a result, likewise the at least one latch element 75 is oriented vertically upward in the direction of the running surface 26. A stiffening 47 is provided above the push members 23.

A recess 84 is preferably provided in the running surface 26 of the track 16. This recess 84 can be closeable by a cover. A locking device 86 is provided below the recess 84. This locking device 86 includes a latch 87, which engages into the latch element 75. As a result, a displacement of the push column 21 is prevented in one direction, namely the direction in which the push column 21 automatically dives into base body 31 when applied with load, or the track 16 is lowered from a working position 12 into a basic position 19. This latch position 88 is shown in FIG. 13. In the opposite direction, the lift column 21 can extend, since a sliding surface 90 is present on the latch 87, whereby a free run is formed. The latch 87 is transferred into the locking position due to the weight. For the active unlocking of the locking position 88, for example a magnetic drive 82 of the locking device 86 is controlled to, whereby the latch 87 is released from the locking position 88.

FIG. 16 shows an alternative embodiment of the tracked lifting platform 11, in comparison to FIG. 1. In this embodiment, it is provided that the support structure 34 of the lifting mechanism 18 is arranged outside the base body 31 of the track 16. For example, the support structure 34 is on the ground of a factory or the like, or preferably lowered into the ground, so that when lowering the track 16 into a basic position 19, the track 16 can either rest on the ground or even be flush with the ground. The free end of the push column 21 engages on the lower side of the track 16. This free end of the push column 21 can also be positioned to engage inside the base body 31.

The lifting mechanisms 18 engaging on a track 16 are preferably oriented in the orientation of the support structure 34 or of the drives 48 in a manner to be facing each other. These can also respectively be oriented in a manner to be turned by 180°. In the orientation shown in FIG. 16, the push columns 21 of the lifting mechanisms 18 stiffen each other mutually.

The function and the operation of the tracked lifting platform 11 correspond to the above described embodiments. Just as well, various alternative embodiments of the drive 48 can be provided in this embodiment. This arrangement provides the advantage that the units can be positioned lowered in the ground, so that merely the sensors are to be arranged on or in the track 16 for the monitoring of the track 16.

FIGS. 17 and 18 schematically show an enlarged view of a locking device 86 for the arrangement of the lifting mechanism 18 according to FIG. 16. The locking device 86 is assigned to the deflection device 36. Immediately after the transfer of the push members 23 into the vertical orientation, a latch 87 of the locking device 86 engages on the push member 23, in particular on the latch element 75, so that an unintended retraction movement of the push column 21 is prevented. The latch 87 comprises a sliding surface 90, which causes that the push members 23 can slide along past the latch 87 during an extension movement, but that a blocking is effected in the opposite displacement direction. The latch 87 is moved toward the push members 23 by means of a pressure force. For the unlocking of the latch 87, preferably a magnetic drive 92 is provided, which, upon energization causes that the latch 87 can be translated into an unlocked position, in order to retract the push column 21 into the support structure 34 thereupon, or to lower the working position 12, respectively.

FIG. 19 shows an alternative embodiment of the lifting mechanism 18 compared to FIGS. 4a, 4b and 5. FIG. 20 shows a schematic side view of the lifting mechanism 18 of FIG. 19. The lifting mechanism 18 includes a support structure 34 with a deflection device 36 and a guidance 37. The guidance 37 preferably is oriented horizontally. The deflection device 36 enables a deflection of the individual push members 23 of the push column 21 from a horizontally oriented arrangement to a vertical arrangement. To that end, a drive 48, in particular a lifting cylinder 49, is provided. The above described embodiments of the drive 49 and/or of the support structure 34 apply in analogy.

In this embodiment, it is provided that the push members 23 are assigned to one another by means of a belt 105, and fixedly connected to one another thereby. The push members 23 can be deflected around a deflection axis 25 from the guidance 37 via the deflection device 36 into the vertical direction. The said deflection axis is formed by the course of the guidance path 38. The said path may represent a quarter circle to allow a 90° deflection. The guidance path 38 can also be formed in a manner to be non-uniformly curved, or to be non-circular, to enable the deflection. The deflection axis 25 can be located outside the deflection device 36.

By the formation of the belt 105, which extends between a right and left guidance path 38 of the deflection device 36, a lateral guidance of the push members 23 in relation to the support structure 34 is made possible at the same time.

The individual push members 23 are connected to one another by the belt 105, which is also deflectable. Preferably, the belt 105 is either exclusively guided by the guidance path 38, or guided together with guiding elements arranged on the push bodies 44, in the guidance path 38. The belt 105 can be formed by a bendable steel belt or steel strip, for example, e.g. made of a spring steel sheet or precious steel sheet. Alternatively, a reinforced plastic can be provided, preferably by means of a fabric-reinforced plastic band. By means of this band or belt 105, the push members 23 can be deflected by 90°, but in a vertical arrangement along the longitudinal axis of the push column 21, the individual push members 23 are disposed one above the other in a pressure-resistant manner. This belt 105 increases the lateral stability of the push members 25.

The push bodies 44 have facing pressure surfaces or at least pressure surface sections 81. On one of the two adjacent push bodies 44, a recess 97 is formed on the pressure surface 81, in which a protrusion 96 can engage, which is provided on the adjacent pressure surface 81 of the neighboring push body 44. The push members 23 can be oriented to one another thereby, so that they are secured against a lateral displacement in the plane of the pressure surfaces 81.

As an alternative embodiment of the lifting column 21 with a belt 105, it can be provided that additionally a safety device 110 is provided in the push column 21. The safety device 110 blocks a degree of freedom, by which the push members 23 can be pivoted to one another. In particular in the vertical arrangement of the push members 23, this degree of freedom is blocked. The safety device 110 includes a clamping device 111, which can be assigned to the push members 23 guided out of the deflection device 36, and engages on these members, for example. By means of a supply and/or winding device, which is not illustrated in more detail here, the push column 21 can also be extended, so that the push members 23 are coupled with the clamping device 111. In one exemplary embodiment, a clamping device 111 formed as a belt may comprise openings 115, in which pins 114 in the push body 44 engage in a releasable manner. Thereby, it can be ensured that the one degree of freedom, by which the push members 23 are pivotable to one another, is also blocked, in order to form a pressure-stable or pressure resistant push column 21. During a lowering movement of the push column 21, the clamping device 111 is decoupled or released e.g. when translating the push members 23 in the direction of the deflection device 36, for example via a gear or the like, and the clamping means 111 can be wound on to a roll or a storage element of the supply and/or winding mechanism.

Alternatively to the belt shown in FIGS. 19 and 20, which is coupled or decoupled to or from the push members when retracting or extending the push column 21, a safety device 110 can be provided in which the clamping device 111 is also formed as a belt and is assigned push members 23 parallel to the belt 105. Such an embodiment is shown in a perspective view in FIG. 21, and in a side view in FIG. 22. The clamping device 111 is preferably fixed on at least the first and last push member 23. This can be effected, for example, by means of a pin 114 in an opening 115, wherein the clamping device 111 also is arranged in a manner to be releasable from the push members 23.

In this embodiment, it is provided that the clamping device 111, which is also formed as a belt, extends parallel to the belt 105 in a retraction and extension movement of the lifting column 21. By the fixing of the clamping device 111 on the first and last push members 23, a relative movement between the push members 23 and the clamping device 111 can be effected during the deflection. Due to the fact that the push members 23 which are first in the extension direction are also deflected in the retracted state of the push column 21, or in the basic position of the push column 21, the length ratios between the belt 105 and the clamping device 111 remain the same between the basic position 19 and the working position 12.

Furthermore, it can alternatively be provided that the clamping device 111 is formed by a Bowden cable or a chain, for example, which is also fastened to the first and last push members 23 of the push column 21, and practically achieves a similar effect as the belt as a clamping device 111. This Bowden cable or chain is preferably deflected via an additional deflection, which is provided on the deflection device 36.

FIG. 23 shows a further alternative embodiment of the lifting mechanism 18 compared to FIGS. 4a, 4b and 5. FIG. 24 shows a schematic side view of the lifting mechanism 18 according to FIG. 23. In this embodiment, it is provided that the push members 21 are provided loosely to one another in the support structure 34. The support structure 34 in turn consists of a deflection device 36 and a guidance 37. The guidance 37 opens into a guidance path 38 of the deflection device 36. The push members 23 for example have laterally protruding guidance elements 117, by means of which the push members 23 are guided in the support structure in a displaceable manner. The guidance elements 117 are deflectable around the deflection axis 25. This deflection axis 25 is preferably located outside the deflection device 36, so that a sufficiently large deflection region is created, so that the push members 23 can be deflected along the deflection or support surface 118 on the push bodies 44 correspondingly by 90°. The support or deflection surface 118, which is preferably provided between the push members 23, allows a pressure-stable arrangement and line-up of the individual push members 23.

This embodiment can also comprise a safety device 110. In this case, a clamping device 111 can be provided opposite the deflection axis 25, which device extends parallel to the push column 21. The clamping device 111 is formed, for example, by one or two parallel clamping cables or pulling cables running parallel to the longitudinal direction of the push column 21. This clamping device 111 is guided in a deflectable manner by means of a deflection 112, such as a deflection roller, and preferably received by the deflection device 36. It is preferably provided in this arrangement that the clamping device 111 engages in the longitudinal central axis of the push column 21 or, in case of two or more pulling cables, on the push members 23 in such a way that the common resulting force is located in the longitudinal axis of the push column 21. This arrangement makes it possible that the individual push members 23 are arranged and held in a pressure-resistant manner to one another after the extension of the push column 21, so that these members are secured against a kinking in the outward direction. In this embodiment, it is provided that the clamping device 111 preferably engages on the first and last push member 23 of the push column 21, so that a certain pre-tension on to the push members 23 is always present, and thus the stiffness is provided during the lowering and lifting of the push column 21.

The lifting mechanism 18 according to FIG. 25 corresponds to the embodiment of the lifting mechanism 18 according to FIG. 17. The embodiment of the lifting mechanism 18 in FIG. 25 is modified with respect to the one in FIG. 17 in such a way that a safety device 110 is provided. This safety device 110 makes it possible that a remaining degree of freedom of the push column 21, in which the push members 23 are pivotable about the deflection axis 25 or the articulated axle 41, is blocked. In accordance with the embodiment shown in FIG. 25, the individual push members 23 can be held one on top of the other by a clamping device 111, so that a pivoting movement around the deflection axis 25 or articulated axle 41 is prevented. For example, the clamping device 111 engages on the base plate 30, or on the first push member 23 of the push column 21 on the one hand, and on the last push member 23 of the push column 21 on the other hand. The clamping device 111 is deflected or guided by a deflection means 112 in the area of the deflection device 36. In the exemplary embodiment, the clamping device 111 is formed as a pulling cable or tension cable. Alternatively, a chain or the like can also be provided.

FIG. 26 shows an alternative embodiment of the tracked lifting platform 11 in comparison to FIG. 1 or 16. In this embodiment, it is provided that lifting mechanisms 18 according to the embodiment in FIG. 25 are used. The lifting mechanisms 18 are not oriented in a right-angled manner, in relation to the longitudinal axis of the push members 23 or their deflection axis 25 or articulated axle 41, to the longitudinal axis of the track 16, but parallel to the longitudinal axis of the track 16. The lifting mechanisms 18 are thus turned by 90° relative to the longitudinal axis of the track 16, when compared to the embodiment of the track 16 in FIGS. 1 and 16. Here, the lifting mechanisms 18, can be oriented to face one another with the support structures, in particular the drives 48, as show in FIG. 26. Thus, the contact points of the base plate 30 at the lower side of the neighboring tracks 16 are offset to one another. Alternatively, the lifting mechanisms 18 can also be arranged in a manner rotated by 180°, so that the support structures 34 are oriented not side by side, but in opposite directions. The lifting mechanisms 18 can then be arranged at the same height with respect to the end region of the tracks 16.

FIG. 27 shows a section of an alternative embodiment of a push column 21 with e.g. four push members 23. FIG. 28 shows a perspective view on to the push member 23 of the alternative push column 21. In this alternative embodiment of the push members 23, e.g. the push body 44 is formed of a solid material. Said body may comprise one or multiple recesses 95 in order to prevent an accumulation of material. In addition, at least one supply line can be guided alongside such a recess. These push elements 23 may comprise a supporting contour 70. The stiffening sections 72 are formed arc-shaped or semicircular-shaped or in the form of two domes having a dell in-between them. This supporting contour 70 basically corresponds to the contour of the embodiment according to FIGS. 12 and 13. However, this push body 23 can be an extrusion-molded profile, in particular an aluminum profile or a push body 44 injection-molded from a plastics material.

Instead of the lateral tabs 61 with the protrusions 66, protrusions 96, in particular of semicircular shape, are provided in the pressure surface or the pressure surface portions 81, which engage into complementary recess 97, in an orientation of the push bodies 44 along the chain longitudinal axis 24. In turn, this enables a lateral orientation of the push bodies 44 relative to one another and ensures a load transfer. These push members 23 include lateral sliding bodies 98, which bodies can, for example be guided along a deflection device 36 and a guidance 37. In order to form a deflection axis 25, the sliding bodies 98 comprise joint plates 99, which are preferably of circular design and adjacent thereto, a support surface 118 in the shape of a circular arc. The support surface 118 and the joint plate 99 are formed complementary on opposite ends of the sliding body 98. This allows that upon lining-up these push members 23, the joint plates 99 engage one another and are opposite one another, such that a lateral displacement is prevented. In addition, the face sides of the joint plates 99 of the push members 23 can roll-off on the support surfaces 118 for transfer out of the guidance 37 and in a vertical orientation, or in addition likewise be supported in a secure manner.

The sliding bodies 98 may comprise recesses 100, which each extend lengthwise along the sliding body 98, i.e. in the longitudinal direction of the push column 21. A clamping device 111, in particular a clamping cable or pull cable or the like, can extend through the recess 100 and in-between the first and the last push member 23. The recess, in one direction along the push column 21 with respect to the neighboring push member 23, comprises a widening 142. This enables that the clamping device 111 can be guided therethrough unhindered during a pivot movement of two neighboring push members 23. As a result, the tensioning force between the first and the last push member 23 is maintained, irrespective of the deflection. In this way, the joint plates 99 and the support surfaces 118 are held in a manner to rest one on top of the other, for fixedly-connecting the push members 23 with one another, which members are basically lined-up in a loose manner. This way can be effected an additional rigidity upon the impact of the lateral force and/or of a lifting-up force, in particular.

FIG. 29 shows another alternative embodiment of a push member 23. This push member 29 can be made of an extrusion-molded material, or a solid material, can be made of plastics, metal or the like. Alternatively to the push members 23 in FIG. 27, it is provided for these push members 23 to have the joint holes 63, 64 formed directly and in one piece on the push body 44. Thus, the entire push member 23 is preferably formed in one piece, just like in FIG. 27. An additional, lateral orientation of the push members 23 located one on top of the other can be made possible by means of the protrusions 96 protruding opposite to a pressure surface portion 81. In addition, it can also be ensured, that the push members 23 are provided in a manner as to be oriented in a manner one on top of the other along the longitudinal axis of the push column, in order to allow for a maximum load transfer.

In another, alternative embodiment of the push column 21, which is not illustrated in greater detail here, it is provided that a securing device is provided in each case between two neighboring push members 23, through which device a pivoting movement of the push members 23 about a deflection axis 25 or an articulated axle 41 is blocked. The securing device can be provided in the region of the pressure surfaces 81 or the pressure surface portions. Alternatively, this securing device can also be provided on the stiffening section(s) 72 and or web portion(s) 73. This securing device locks automatically upon extension of the push column 21 in a vertical direction out of a basic position 19 into the working position 12. When retracting the push column 21 from the working position 12 into the basic position 19, the securing device is unblocked by means of the deflection device 36, so that the push members 23 can be displaced and deflected along the guidance path 38.

The tracked lifting platform 11 according to the invention preferably comprises a monitoring device for secure operation. This monitoring device communicates with a control 33. The control 33 can be arranged in the track 16 (see FIG. 10). The control 33 can be provided on the lifting mechanism 18, in particular on the support structure 34 (see FIG. 5). Operation of the lifting mechanism 18 and/or of the track is controlled, monitored and/or regulated by means of the control 33. Multiple information related to the working state or the active state of the tracked lifting platform 11 can be displayed to the user, or be requested by the user. As an alternative, an operating stand can be provided in a manner to be fixedly anchored in the ground. The magnetic drive 92 is preferably equipped with a sensor element 104 (see FIGS. 15 and 18), which detects whether the latch 81 is held in the locking position 88, or in an unlocked position actuated by means of the magnetic drive 92. The monitoring device can further include one or more tilt sensors 101 (cf. FIG. 8). The tilt sensor(s) 101 can detect both an orientation of the track 16 in longitudinal direction with respect to the horizontal, as well as a tilting of the track 16 about the longitudinal axis of the track 16. In addition, a displacement sensor 102 (cf. FIG. 10) monitors an extension movement of the push column 21, for example. This displacement sensor 102 can directly detect a change in the position of the inside push element 23 of the push column 21, or an extension movement of a piston rod 52 of the lifting cylinder 49. Such a displacement sensor 102 can also be formed as a Bowden cable sensor. The position of the latch 87 of the locking device can be monitored by means of a monitoring sensor 104 (cf. FIGS. 14, 15 and 17).

Furthermore, a force sensor 103 can be provided, which is for example arranged on or integrated in the base plate (FIG. 8). In this way, an uneven distribution of load on the respective push column 21 can be detected.

Insofar as a clamping device 111 is provided, at least one force sensor 103 (see FIGS. 22 and 25) can be provided between the contact point on the push member 23 and the clamping device 111, by means of which is also enabled a further monitoring. Insofar the push members 23 are connected with a belt 105, at least one sensor 103 can be provided on the belt 105 or between the belt 105 and at least one push member 23 fixed thereto, in order to detect an application of force. Insofar the sensor is provided on the belt or at the belt 105, the latter can for example be a strain gauge.

Furthermore, it can be provided, that optical signaling elements and/or lighting elements 141 are provided on a lower side of the track 16 for the working space (FIG. 17). Likewise, optical signal transducers and/or lighting elements can be provided on or in the push column 21. For example, an LED lighting strip can be guided alongside the rear wall 71 or the web portions 73 of the push members 23, in other to this way additionally illuminate the working spaces or to output warning signals into the working space.

The individual sensors of the monitoring device can communicate in a wired or wireless manner and forward their data to the control device. Preferably, at least one accumulator can be provided in the base body 31 of the track 16, so that during an operation of the track 16, no electric lines are provided on the floor of the working space. In addition, it can be provided that a control of the tracked lifting platform 11 is enabled in the ground and adjacent to the two tracks 16 or on an operating device stationary fixed on the ground and arranged neighboring the track 16, so that the operator is not located within the working space of the tracks 16 of the tracked lifting platform 11 during the upward/downward movement of the tracks 16.

As used herein, the term vehicle relates to vehicles with two or more axles. These can be passenger cars, trucks or other commercial vehicles or transport vehicles. Likewise, railroad vehicles are also comprised by the term "vehicle". The displacement track can be adapted to the respective vehicle to be lifted. In the case of a railroad vehicle, the displacement track is formed as a railroad track, for example.

The invention claimed is:

1. A tracked lifting platform for vehicles with at least two tracks, wherein each track acts at least at a respective end region of a lifting mechanism for lifting and lowering the track between a basic position and a working position, wherein the lifting mechanism comprises a push column with a plurality of push members that can be arranged one above the other so as to be resistant to pressure in the vertical direction, wherein the lifting mechanism comprises a drive which is arranged on or in the base body of the track or on the support structure, and the drive is formed as a hydraulic or pneumatic lifting cylinder, and wherein two lifting mechanisms are provided for each track and the lifting mechanisms are separate from each other.

2. The tracked lifting platform according to claim 1, wherein the lined-up push members of the push column stand in connection with one another about a deflection axis, formed at least between two adjacent push members, which is oriented eccentrically to a push body and transversely to the longitudinal direction of the push column, and are pivotable in a direction about the deflection axis and, in the opposite direction, are configured to be rigid in compression by the superposed push bodies of the push members.

3. The tracked lifting platform according to claim 1, wherein at least in each end region of the track, the push column is provided, and that the push columns are oriented in opposite directions.

4. The tracked lifting platform according to claim 1, wherein the push members of the opposing push columns are oriented such that the push members are pivotable towards the center of the track.

5. The tracked lifting platform according to claim 1, wherein the lifting mechanism comprises the support structure comprising at least one deflection device and a guidance, through which the push column is accommodated in a retractable and extendable manner.

6. The tracked lifting platform according to claim 5, wherein the deflection device deflects the push column by 90° in a vertical direction relative to the guidance adjoining the deflection device.

7. The tracked lifting platform according to claim 5, wherein an end of the push column, which is guidable out of the support structure, engages on an underside of the track or a base body of the track, and the support structure of the lifting mechanism is provided on or in the ground, or that the support structure of the lifting mechanism is arranged on or in the base body of the track and the end of the push column, which is guidable out of the support structure, is arranged on or in the ground.

8. The tracked lifting platform according to claim 7, wherein in or on the base body, or on the support structure, or the track, a synchronization control having at least one sensor device is provided, which monitors and actuates the retraction and extension of the at least two push columns and/or the lifting and lowering movement of at least two tracks.

9. The track lifting platform according to claim 5, wherein the lined-up push members are supported, in the deflection device, on mutually opposite support surfaces or rolling surfaces and are deflectable, or that the line-up push members are supported and deflectable by at least one joint connection element.

10. The tracked lifting platform according to claim 1, wherein the drive is formed as an electrically, electromagnetically, pneumatically or hydraulically driven motor with a gearbox, a servo mechanism or a Bowden cable or as a pneumatic bellows.

11. The tracked lifting platform according to claim 10, wherein the hydraulic lifting cylinder is arranged on or in the base body of the track or on the support structure such that, in a lifting movement of the track from the basic position to the working position, the piston rod of the lifting cylinder is acted upon by a tensile force.

12. The tracked lifting platform according to claim 11, wherein the free end of the piston rod of the lifting cylinder is guided, with a guide element, in the guidance of the support structure.

13. The tracked lifting platform according to claim 10, wherein the piston rod of the lifting cylinder faces the track center or to the end of the support structure opposite the deflection device, and a push element is arranged on the free end of the piston rod, which element is connected to the horizontal end of the push column.

14. The tracked lifting platform according to claim 10, wherein on or in the base body of the track two lifting cylinders oriented in opposite direction are provided on or on the base body of the track, which are arranged laterally offset, in opposite directions, to the longitudinal central axis of the body.

15. The tracked lifting platform according to claim 1, wherein the push members comprise at least one latch element on a portion of the push member opposite the deflection axis or the articulated axle, on which latch element a latch of a locking device acts or engages and blocks a lowering movement of the track from the working position and the latch is provided above the push members of the push column which are displaceably-arranged on or in the base body, and that the at least one latching element of the push member, when guided on or in the base body of the track, is oriented vertically upward so that the latch, under gravity, engages into the latch element.

16. The tracked lifting platform according to claim 15, wherein the locking device is arranged in the base body and is accessible via a recess in a running surface of the track.

17. The tracked lifting platform according to claim 15, wherein the locking device is assigned to the deflection device and a latch engages at the respective first push member, which is oriented vertically by the deflection device and guided out of the deflection device, and the latch is lockable by means of a tension or compression force, or weight and in a retracting movement of the push column into the support structure, the locking device, immediately in front of the deflection device, itself is unlockable by an unlocking device or by the deflection device.

18. The tracked lifting platform according to claim 15, wherein the locking device comprises a magnetic drive, which guides a latch out of the latch element when activated, or has a lever or a cam guiding the latch mechanically out of the latch element.

19. The tracked lifting platform according to claim 1, wherein the at least one track comprises a monitoring device comprising at least one tilt sensor) for the orientation of the tread of the track, and/or a force sensor on at least one end of the push column or on the base plate, and/or a displacement sensor for detecting a stroke path of the track and/or a sensor for detecting a locking position of the locking device and/or a signal device for outputting optical and/or acoustic signals.

20. The tracked lifting platform according to claim 1, wherein each track, in or on the base body or on the support structure, comprises a control device and/or monitoring device, which communicate wirelessly with one another, and are controllable with a control device, wirelessly.

21. The tracked lifting platform according to claim 1, wherein, on each track for lifting and lowering, exclusively lifting mechanisms engage that comprise a push column with a plurality of push members, and two tracks spaced in parallel are provided uncoupled, in particular without mechanical connection.

22. The track lifting platform according to claim 1, wherein the push members are pivotable in one direction and, in the opposite direction, are arrangeable pressure-resistant by push bodies of the push members, and the push member, perpendicular to the longitudinal direction of the push column comprises at least one supporting contour which, starting from a rear wall of the push body, extends opposition to the pivoting direction and the supporting contour of the push body comprises two stiffening sections, and a web portion is provided between the stiffening sections and at least one latching element is arranged on the web portion.

23. The track lifting platform according to claim 22, wherein the stiffening sections extend over the entire height of the push body, seen in the longitudinal direction of the push column, and each comprise at least one pressure surface portion at the end face toward the adjacent push body of the push member.

24. The track lifting platform according to claim 22, wherein in each case one tab is provided laterally on the push body, which tab comprises hinge holes for two joint connection elements spaced in parallel one relative to the other in longitudinal direction of the push column for connecting adjacent push members.

25. The track lifting platform according to claim 24, wherein the respective articulated axle is formed by two separately arranged joint connection elements located in the articulated axle.

26. The track lifting platform according to claim 24, wherein on each outer side of the joint connecting element is provided in each case a roller or a sliding body for being guided in a deflection direction and/or guidance.

27. The track lifting platform according to claim 24, wherein the tabs or end surfaces of the push bodies oriented perpendicular to the longitudinal direction of the push column comprise protrusions in the longitudinal direction of the push column, which project beyond the pressure surface portions of the push body and, oppositely, on the push body or opposite the pressure surface portions of the push body comprise recesses, into which the protrusions of the adjacent push body engage in a pressure-resistant arrangement of the push members.

* * * * *